(12) United States Patent
Bukhin et al.

(10) Patent No.: US 9,026,261 B2
(45) Date of Patent: May 5, 2015

(54) METHODS AND SYSTEMS FOR MANAGING ENERGY USAGE IN BUILDINGS

(75) Inventors: Michael Bukhin, Otis, MA (US); Paul Cole, Gloucester, MA (US); Robert Faludi, New York, NY (US); Demetrie Tyler, Santa Cruz, CA (US)

(73) Assignee: Tendril Networks, Inc., Boulder, CO (US)

( * ) Notice: Subject to any disclaimer, the term of this patent is extended or adjusted under 35 U.S.C. 154(b) by 286 days.

(21) Appl. No.: 12/796,408

(22) Filed: Jun. 8, 2010

(65) Prior Publication Data

US 2011/0022242 A1    Jan. 27, 2011

Related U.S. Application Data

(60) Provisional application No. 61/185,012, filed on Jun. 8, 2009.

(51) Int. Cl.
*G06F 19/00* (2011.01)
*H02J 3/14* (2006.01)
*G06Q 10/06* (2012.01)
*G06Q 50/06* (2012.01)
*H02J 13/00* (2006.01)

(52) U.S. Cl.
CPC . *H02J 3/14* (2013.01); *G06Q 10/06* (2013.01); *G06Q 50/06* (2013.01); *H02J 13/001* (2013.01); *H02J 2003/143* (2013.01); *Y02B 70/3225* (2013.01); *Y02B 70/3266* (2013.01); *Y04S 20/222* (2013.01); *Y04S 20/242* (2013.01)

(58) Field of Classification Search
USPC ............. 700/295, 276, 291; 702/61; 705/412; 315/307
See application file for complete search history.

(56) References Cited

U.S. PATENT DOCUMENTS

| | | | |
|---|---|---|---|
| 5,179,556 A | 1/1993 | Turner | |
| 5,572,438 A | 11/1996 | Ehlers et al. | |
| 5,684,710 A | 11/1997 | Ehlers et al. | |
| 5,696,695 A | 12/1997 | Ehlers et al. | |
| 5,719,861 A | 2/1998 | Okanoue | |
| 5,865,991 A * | 2/1999 | Hsu | ................. 210/87 |
| 5,924,486 A | 7/1999 | Ehlers et al. | |

(Continued)

FOREIGN PATENT DOCUMENTS

WO     WO-0074306     12/2000
WO     WO-2012068503   5/2012

OTHER PUBLICATIONS http://www.diykyoto.com/, accessed on Aug. 9, 2010.

(Continued)

*Primary Examiner* — Kidest Bahta
(74) *Attorney, Agent, or Firm* — Perkins Coie LLP

(57) ABSTRACT

A method and system for managing energy usage in a building is provided. The method includes collecting data on energy consumption in the building on a generally continuous basis for at least a given time period. Information relating to the energy consumption is displayed to a user on one or more devices. The information includes (a) the data collected on energy consumption to be displayed in real-time on the one or more devices, (b) a comparison of the data collected on energy consumption in the building to energy consumption data of a cohort or group of cohorts, (c) recommendations for reducing energy consumption in the building based on the data collected on energy consumption, and (d) progress report data comparing the data collected on energy consumption to a desired consumption level.

62 Claims, 21 Drawing Sheets

(56) References Cited

U.S. PATENT DOCUMENTS

| | | | |
|---|---|---|---|
| 5,949,976 | A | 9/1999 | Chappelle |
| 5,959,529 | A | 9/1999 | Kail, IV |
| 6,028,857 | A | 2/2000 | Poor |
| 6,092,207 | A | 7/2000 | Kolinski et al. |
| 6,178,362 | B1 * | 1/2001 | Woolard et al. ............... 700/295 |
| 6,208,247 | B1 | 3/2001 | Agre et al. |
| 6,216,956 | B1 | 4/2001 | Ehlers et al. |
| 6,631,309 | B2 * | 10/2003 | Boies et al. ................... 700/291 |
| 6,640,248 | B1 | 10/2003 | Jorgensen |
| 6,680,922 | B1 | 1/2004 | Jorgensen |
| 6,684,339 | B1 | 1/2004 | Willig |
| 6,785,592 | B1 * | 8/2004 | Smith et al. ................... 700/291 |
| 6,859,831 | B1 | 2/2005 | Gelvin et al. |
| 6,947,483 | B2 | 9/2005 | Engwer |
| 7,058,657 | B1 | 6/2006 | Berno |
| 7,062,389 | B2 * | 6/2006 | Johnson et al. ................. 702/61 |
| 7,130,719 | B2 | 10/2006 | Ehlers et al. |
| 7,171,287 | B2 | 1/2007 | Weiss |
| 7,245,947 | B2 | 7/2007 | Salokannel et al. |
| 7,263,450 | B2 * | 8/2007 | Hunter ............................ 702/65 |
| 7,266,428 | B2 | 9/2007 | Alexanian |
| 7,302,634 | B2 | 11/2007 | Lucovsky |
| 7,333,821 | B2 | 2/2008 | Willey |
| 7,356,548 | B1 * | 4/2008 | Culp et al. ........................... 1/1 |
| 7,505,852 | B2 | 3/2009 | Board |
| 1,016,671 | A1 | 7/2011 | Kordik et al. |
| 8,176,095 | B2 * | 5/2012 | Murray et al. ................. 707/805 |
| 8,239,046 | B2 | 8/2012 | Koehler et al. |
| 2002/0002636 | A1 | 1/2002 | Vange et al. |
| 2002/0071398 | A1 | 6/2002 | Moran et al. |
| 2003/0069970 | A1 | 4/2003 | Kim et al. |
| 2003/0190912 | A1 | 10/2003 | Jampolsky et al. |
| 2004/0117330 | A1 | 6/2004 | Ehlers et al. |
| 2004/0133314 | A1 | 7/2004 | Ehlers et al. |
| 2004/0138981 | A1 | 7/2004 | Ehlers et al. |
| 2004/0139038 | A1 | 7/2004 | Ehlers et al. |
| 2004/0249515 | A1 * | 12/2004 | Johnson et al. ............... 700/291 |
| 2004/0260411 | A1 | 12/2004 | Cannon |
| 2004/0262410 | A1 | 12/2004 | Hull |
| 2005/0038571 | A1 * | 2/2005 | Brickfield et al. ............ 700/295 |
| 2005/0043829 | A1 | 2/2005 | Rossides |
| 2005/0096060 | A1 | 5/2005 | Rajkotia et al. |
| 2005/0096857 | A1 * | 5/2005 | Hunter ............................ 702/60 |
| 2005/0124358 | A1 | 6/2005 | Willey |
| 2005/0157723 | A1 | 7/2005 | Kim et al. |
| 2006/0200542 | A1 | 9/2006 | Willig |
| 2006/0209789 | A1 | 9/2006 | Gupta et al. |
| 2007/0043477 | A1 | 2/2007 | Ehlers et al. |
| 2007/0043478 | A1 | 2/2007 | Ehlers et al. |
| 2007/0097993 | A1 | 5/2007 | Bojahra et al. |
| 2007/0174644 | A1 | 7/2007 | Willig |
| 2007/0251461 | A1 | 11/2007 | Reichard et al. |
| 2008/0129495 | A1 | 6/2008 | Hitt |
| 2008/0263196 | A1 | 10/2008 | Kansal et al. |
| 2008/0306985 | A1 | 12/2008 | Murray et al. |
| 2009/0007706 | A1 | 1/2009 | Hitt et al. |
| 2009/0045256 | A1 * | 2/2009 | McInerney et al. ........... 235/381 |
| 2009/0059842 | A1 | 3/2009 | Maltseff et al. |
| 2010/0010678 | A1 | 1/2010 | Dawson et al. |
| 2010/0031324 | A1 | 2/2010 | Strich et al. |
| 2010/0042453 | A1 | 2/2010 | Scaramellino et al. |
| 2010/0070101 | A1 | 3/2010 | Benes et al. |
| 2010/0070102 | A1 | 3/2010 | Benes et al. |
| 2012/0323637 | A1 | 12/2012 | Cushing et al. |
| 2013/0013121 | A1 | 1/2013 | Henze et al. |

OTHER PUBLICATIONS http://www.theenergydetective.com/home, accessed on Aug. 9, 2010.
http://www.bluelineinnovations.com, accessed on Aug. 9, 2010.
http://www.theowl.com/, accessed on Aug. 9, 2010.
http://www.ambientdevices.com/products/energyjoule.html, accessed on Aug. 9, 2010.
http://hes.lbl.gov/consumer, accessed on Aug. 9, 2010.
http://www.greenenergyoptions.co.uk/, accessed on Aug. 9, 2010.
http://onzo.com/solutions/, accessed on Aug. 9, 2010.
http://www.opower.com/Products/Overview.aspx, accessed on Aug. 9, 2010.
http://www.alertme.com/, accessed on Aug. 9, 2010.
http://silverspringnetworks.com/products/index.html, accessed on Aug. 9, 2010.
http://www.agilewaves.com/, accessed on Aug. 9, 2010.
http://www.energyhub.net, accessed on Aug. 9, 2010.
http://www.tendrilinc.com/products/vision/, accessed on Aug. 9, 2010.
http://www.powermand.com/dreamwatts-product, accessed on Aug. 9, 2010.
http://www.energy-aware.com/, accessed on Aug. 9, 2010.
http://www.consert.com/, accessed on Aug. 9, 2010.
http://www.lem.com/hq/en/content/view/276/215/, accessed on Aug. 9, 2010.
http://www.google.com/powermeter/about/, accessed on Aug. 9, 2010.
http://blog.microsoft-hohm.com/Hohm-energy-report-sample.aspx, accessed on Aug. 9, 2010.
http://efficiency20.com/, accessed on Aug. 9, 2010.
Retzlaff et al. Conservation & Energy Potential Study for Smith River Rancheria:, Smith River Rancheria, Evergreen NRG/Strategic Energy Solutions, Aug. 2005, 417 pages.
U.S. Appl. No. 61/446,233; Inventor: Henze; filed Feb. 24, 2011, 17 pages.
Kennedy, James and Russell Eberhart. "Particle Swarm Optimization," Proceedings of the IEEE International Conference on Neural Networks (Perth, Australia), 1995, pp. 1942-1948.
Doebber, I."Investigation of Concrete Wall Systems for Reducing Heating nad Cooling Requirements in Single Family Residences" [online], Sep. 2004 [retrieved on Mar. 9, 2014]. Retrieved from the Internet<URL: http://scholar.lib.vt.edu/theses/available/etd-10262004-21448/unrestricted/FinalThesis.pdf>.
International Search Report and Written Opinion; International Application No. PCT/US2011/061470; mailed Apr. 9, 2014; 9 pages.

* cited by examiner

Your saving goal

We've looked at your historical billing data and have come up with a few options for you to set a simple goal.

What annual savings goal would you like to set?

- ○ 30% Difficult (approx. $360 a year)
- ○ 25% Difficult (approx. $300 a year)
- ◉ 20% Moderate (approx. $240 a year)
- ○ 15% Moderate (approx. $180 a year)
- ○ 10% Easy (approx. $120 a year)
- ○ 5% Easy (approx. $60 a year)

You can always change your savings goal, as well as find out about other opportunities for savings in your 'savings & goals' panel once you reach the website.

[Back] [Save and continue]

Finish later

FIG. 7

Welcome Pat Milner! ▷Setup ▷Home audit ▷Saving plan ▷Finish

Your home self-audit

By answering detailed questions about your household appliances and lighting, we can give you a detailed break down of your electricity use so you can better identify tasks to meet your energy reduction goals.
We are going to ask you a series of questions so that we can estimate your annual consumption by appliance type. This should take about 20 minutes.

The following areas will be covered

Your Home These are some overall background questions about your home.

Lighting We need to know about all of the lighting in tour home.

Appliances This section is broken down into the following areas:
- Kitchen Appliances
- Heating and Cooling
- Home Electronics
- Miscellaneous Appliances Once you have completed all of the questions, you will be able to view estimates and comparisons of your annual consumption.

Finish later

[Back] [Continue]

FIG. 8

Savings Plan

Based on your Home Audit, we have a few recommendations to help you get started on your Savings Plan

Actions are our suggestions for tasks or habits that will help you reduce electricity and reach your saving goal. Your Saving Plan is the area on the website where you can manage your actions. The actions below are recommended based on your answers to the completed self-audit. If you indicate "yes" to any of the actions below, they will be added to your "committed" list, and any "maybe" actions will be added as "considering". Please note that you can edit your actions list at any time through the "Your Savings Plan" feature.

We estimate you spend about $72 a year on indoor lighting.
Are you willing to reduce the energy you use for indoor lighting?

- Use CFLs in indoor fixtures Save $20 a year! [More]
  ○ No  ○ Yes  ○ Maybe
- Reduce wattage in multiple bulb fixtures Save $20 a year! [More]
  ○ No  ○ Yes  ○ Maybe
- Use lighting controls or timers Save $80 a year! [More]
  ○ No  ○ Yes  ○ Maybe
- Install ENERGY STAR indoor light fixtures Save $10 a year! [More]
  ○ No  ○ Yes  ○ Maybe
- Use fluorescent tube lights Save $20 a year! [More]
  ○ No  ○ Yes  ○ Maybe

You could save a lot of money and energy by replacing your older appliances with a new, Energy Star model. For example, an Energy Star dehumidifier could save you more than 210 kWh a year.
Are you willing to replace some of your appliances?

- Buy an ENERGY STAR dehumidifier Save $30 a year! [More]
  ○ No  ○ Yes  ○ Maybe
- Buy an ENERGY STAR dishwasher [More]
  ○ No  ○ Yes  ○ Maybe
- Buy an ENERGY STAR desktop computer Save $60 a year! [More]
  ○ No  ○ Yes  ○ Maybe
- Buy an ENERGY STAR refrigerator Save $10 a year! [More]
  ○ No  ○ Yes  ○ Maybe

FIG. 9

Learn and Save

This area is designed to give you concrete ideas about how to reach your savings goal. The links on the right-hand side allow you to view content by category, or to see all categories at once.

[Go to Learn & Save]

Suggested Actions

Suggested Actions                                                See all actions

| Add | Add | Add |
| Television | Lighting | Lighting |
| Buy an ENERGY STAR television | Use task lighting | Clean light fixtures |

Action are suggestions for tasks or habits that can reduce your electricity use. In the Suggested Action section you can scroll through to find actions that you would consider doing. You can scroll through the list by using the arrows on the right and left side, or click on "See all actions" to view all of them at once.

Click on the action title to view a detailed summary. You will see that each action has a "savings potential" which is how much electricity and money you can save each year by doing that action. These are estimates based on average homes similar to yours. You can "add" an action to yours Saving Plan, which then displays that action on the "Your Saving Plan" page, and estimates the total saving you might achieve.

Within each action screen, you can post a comment to others within the community. This might be encouragement, a summary of your experience that might help others, or a funny story related to the action.

Recent Snapshots

FIG. 12

Community Activity

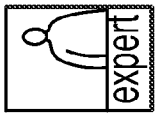
Action Comment expert: emilyw commented on the 'Air dry' action: read more here.
about 18 hours ago

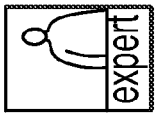
Expert user emilyw commented on the 'First day' snapshot: read more here.
1 day ago

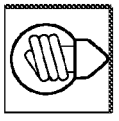
hlippincott commented on the 'Air dry dishes' action: read more here.
1 day ago

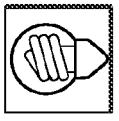
hlippincott commented on the 'Dryer, again' snapshot: read more here.
3 day ago

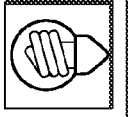
dan kelley posted a new snapshot view it now.
3 day ago

| Dashboard | Learn and Save | Your Saving Plan | Your Home | Your Town | Reports | Send Us Feedback! |

Learn & Save > Ask The Expert > How do I tell the color of a CFL when I'm buying them?

How do I tell the color of a CFL when I'm buying them?

Started 3 months ago by Rob F

Posted 3 months ago by Rob F
When I buy CFLs, some seem to be very white while others have a yellower light. How do I tell the difference when I am purchasing bulbs? I prefer the yellow, but too often I buy a bulb that I am very disappointed in because of its harsh whiteness.

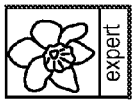 expert

Posted 2 months ago by emilyw
When compact fluorescent light bulbs (CFLs) first came out years ago, they basically came in one type: harsh white. As they have become popularized, they have become available in a range of colors from a warm yellow to a bluish white. When you buy CFL bulbs, look on the packaging for the "color" of the light. Anything labeled :soft white" or "warm white" should have the yellower light (similar to incandescent light), while bulbs labeled "cool white," "bright white," "natural" or "daylight" will have brighter, whiter light that is not as pleasant, but is often good for kitchens and work spaces where you need to see well.

Click here for more detailed information about CLF color and from the Energy Star website.

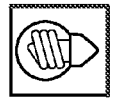

Posted 2 months ago by hlippincott
FYI more details: All fluorescent lights (&LEDs) make light by adding up the colors of their individual phosphors, the way a TV adds together red, blue and green to get a picture that looks TO YOUR EYES as full color. This means that the "color" that Emily explained so well above is dependent on each manufacturer's set of phosphors. You may find that your furniture, rug or drapes only look good with a particular brand of "warm white" or "soft white" CFL. You may also find the "color" is marked as "color temperature" as explained on the Energy Star website.

FIG. 23

Robert C ☐ 0.01 kW | Profile | Points | Settings | Help | Sign out

WELLESLEY MLP MUNICIPAL LIGHT PLANT

Wellesley MLP program

| Dashboard | Learn and Save | Your Saving Plan | Your Home | Your Town | Reports |

Send Us Feedback!

Wellesley    Discussions | Neighbors

[Map showing Wellesley with routes 9, 16, 135, and Wellesley College]

Participating households 29
Total savings 58051 kWh
Avg savings goal 15%

Top Savers

| | Neighbor | Compared to last year |
|---|---|---|
| 1 | Robert C | -49% |
| 2 | Chris.McChesney | -46% |
| 3 | peterbiro | -42% |
| 3 | hlippincott | -42% |
| 4 | darby.shire | -36% |
| 5 | jcalcio | -34% |
| 6 | jmiller | -32% |

Recent Discussions

| Topic | Last post | Replies |
|---|---|---|
| Has monitoring/dashboard and points changed anything in your house? | 4 days ago | 5 |
| Intel device | 4 days ago | 1 |
| Energystar | 8 days ago | 4 |
| Not losing yesterday's target data | 14 days ago | 3 |
| Geothermal | 15 days ago | 2 |

METHODS AND SYSTEMS FOR MANAGING ENERGY USAGE IN BUILDINGS

CROSS REFERENCE TO RELATED APPLICATIONS

This application claims priority from U.S. Provisional Patent Application Ser. No. 61/185,012, filed on Jun. 8, 2009, entitled ENERGY MONITORING SYSTEM, which is hereby incorporated by reference.

BACKGROUND

The present application relates generally to methods and systems for managing and reducing energy consumption in buildings.

BRIEF SUMMARY OF EMBODIMENTS OF THE INVENTION

In accordance with one or more embodiments, a method of managing energy usage in a building is provided. The method includes collecting data on energy consumption in the building on a generally continuous basis for at least a given time period. Information relating to the energy consumption is displayed to a user on one or more devices. The information includes (a) the data collected on energy consumption to be displayed in real-time on the one or more devices, (b) a comparison of the data collected on energy consumption in the building to energy consumption data of a cohort or group of cohorts, (c) recommendations for reducing energy consumption in the building based on the data collected on energy consumption, and (d) progress report data comparing the data collected on energy consumption to a desired consumption level.

A system is provided for managing energy usage in a building. The system includes an apparatus for collecting data on energy consumption in the building on a generally continuous basis for at least a given time period. The system also includes a gateway that communicates with the apparatus for receiving data on energy consumption in the building. The gateway transmits the data on energy consumption in the building to a remote server computer system. The system also includes one or more devices communicating with the gateway or the server for receiving information relating to the energy consumption to be displayed to a user. The information includes (a) the data collected on energy consumption displayed in real-time on the one or more devices, (b) a comparison of the data collected on energy consumption in the building to energy consumption data of a cohort or group of cohorts, (c) recommendations for reducing energy consumption in the building based on the data collected on energy consumption, and (d) progress report data comparing the data collected on energy consumption to a desired consumption level.

Various embodiments of the invention are provided in the following detailed description. As will be realized, the invention is capable of other and different embodiments, and its several details may be capable of modifications in various respects, all without departing from the invention. Accordingly, the drawings and description are to be regarded as illustrative in nature and not in a restrictive or limiting sense, with the scope of the application being indicated in the claims.

BRIEF DESCRIPTION OF THE DRAWINGS

FIG. 7 is a screenshot of an exemplary "savings goal" page presented to users in accordance with one or more embodiments.

FIG. 8 is a screenshot of an exemplary introduction audit screen in accordance with one or more embodiments.

FIG. 9 is screenshot of an example of a savings plan presented to a user.

FIG. 12 is a screenshot of an example of a portion of a user guide in accordance with one or more embodiments.

FIG. 18 is a screenshot of an example of a community activity newsfeed in accordance with one or more embodiments.

FIG. 20 is a screenshot of an example of a threaded discussion page in accordance with one or more embodiments.

FIG. 23 is a screenshot of an example of a "Your Town" page in accordance with one or more embodiments.

DETAILED DESCRIPTION

Figure 1:
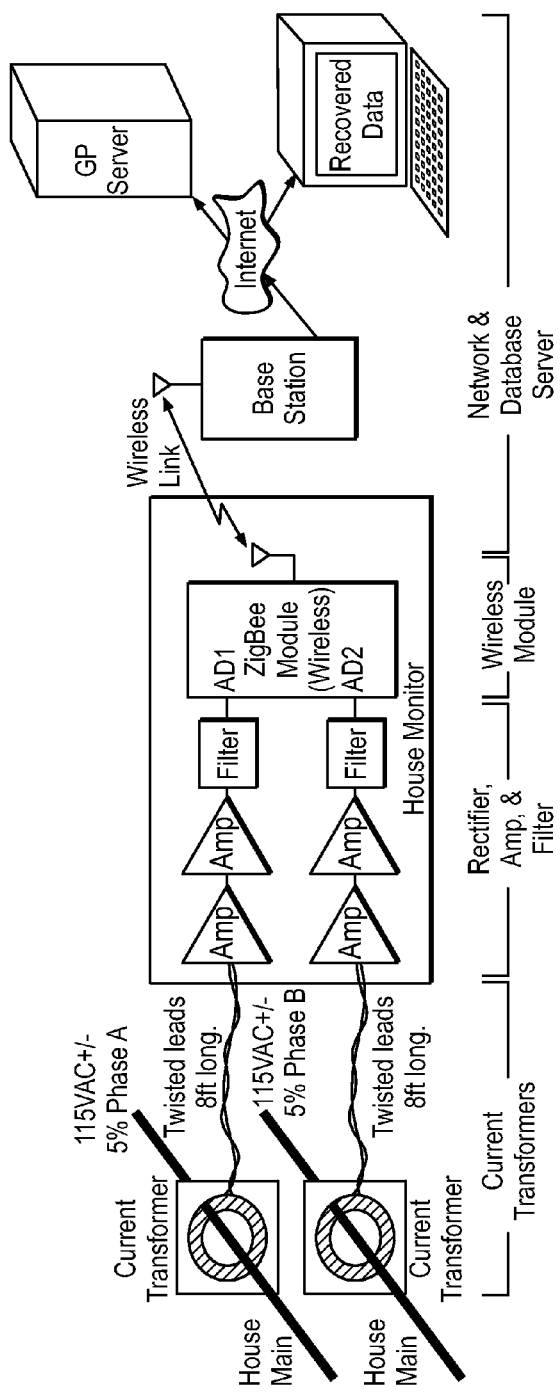
FIG. 1 is a schematic diagram illustrating an energy management system in accordance with one or more embodiments.

Various embodiments disclosed herein are directed to energy monitoring systems and methods that effectively help consumers reduce their energy consumption by combining real time, in home, power monitoring with a scientifically based behavioral change program that can leverage both expert advice and community tools. By coupling real-time energy feedback with historical analysis of energy use, the system can help users reduce energy use and achieve persistent savings. The system can include web server software (described in the exemplary embodiments herein as the iCES—Interactive Customer Engagement System) and a wireless home area network including a house monitor, appliance monitor, gateway, and one or more in house displays. These systems can be provided, e.g., to utility customers with a defined methodology for selecting pilot candidates based upon user profiles, identifying appropriate communications, selecting information sharing options and creating incentive programs to support behavioral change.

While the term 'house' or 'home' is used in the description of some of the embodiments included herein, it should be understood that the methods and systems disclosed herein can be implemented in any type of building (residential, commercial, industrial, etc.). The term 'building' is intended to include entire buildings (e.g., houses) or any portion of a building (e.g., an apartment in an apartment building).

In accordance with one or more embodiments, the system applies proven social science methodologies to improving energy efficiency and conservation, engaging users on a more personal level to reduce their energy consumption as well as creating a feedback loop between the user and the energy provider. Through timely engagement, the system's hardware and software platform can be implemented in varied settings to encourage individuals to manage or reduce energy consumption. In one or more embodiments, behavior change principals (including, e.g., goal setting, feedback, taking action, and social activity) are integrated into the system at both the hardware and software level.

In accordance with one or more embodiments, the system includes an ambient, glance-able display (described in some exemplary embodiments herein as GLANCE), which can incorporate behavior change and social pressure principals to create a generally constant awareness of an individual's energy use. Through a customizable wireless radio router and firmware, different participating populations can be segmented and addressed according to their specific motivations and needs. In accordance with some embodiments, a house level/circuit monitor (current transformer or CT clamps) transfers two second energy consumption data to both a gateway (which passes the data to a community server) and one or more GLANCE displays in the building.

In one or more embodiments, the system includes a data warehouse server at which data can be stored, normalized, and analyzed. The data warehouse server can recognize energy consumption patterns at an individual as well as aggregate level. Through predictive modeling, the server can also be capable of forecasting future energy consumption patterns at both an individual and aggregate level. Users interact with the collected data through a community server. Numerous interfaces with different access privileges can be provided in the community server to service energy consumers, power providers, and system administrators. Power providers can have access to collective historical/trend reporting mechanisms.

In accordance with various embodiments, the energy monitoring system collects and delivers content related to energy efficiency and conservation. The content can be delivered as 'actions' (such as tasks and habits), which provide direction to a user to reach his or her energy savings goal. A task is something a user does once, or after some period of time such as once a year. Tasks have steps attached to them, with more detail on how to complete the task. A habit is something a user does more frequently (and less likely to involve spending money). Habits are important to core behavior change principals, creating an environment of generally continuous engagement and feedback. Habits do not have to-dos, though there are Tips related to Habits. Tips provide the supporting content for Tasks and Habits. Tips can be provided, e.g., in emails and are tied to appliances and devices in a building that consumes energy. The tasks, habits, and related content delivered to a user can be customized based on a user's profile. Content can be managed within a Content Management System (CMS), which can be configured based on client and client preferences.

In accordance with one or more embodiments, the energy monitoring system can implement real time power monitoring at the house, circuit, and plug level. Real time power monitoring of the whole house is sampled and sent to the system's servers. The energy monitoring system in accordance with various embodiments can compare energy consumption data to historical trends, community activity, and an individual's personal goals. This can be done, e.g., through the Home self-audit, Dashboard, Learn and Save, Your Savings Plan, Your Home, Your Town and Reports modules described in further detail below. The system compares individual household consumption with meaningful comparable cohort groups, which can be created, e.g., on initial user "welcome" or setup screens. Since power consumption data is stored on system's servers, the system also has the ability to send consumption data elsewhere (e.g., power company, a user mobile phone, etc.) and to relay messages back to the individual's house through demand-response (e.g., turn down AC remotely, etc.)

In accordance with one or more embodiments, through a series of questionnaires, the system can develop profiles of users. Profiling can help the system discover a user's motivation for saving energy and where their energy is being used. Motivations for saving energy could potentially be monetary, environmental, or consumption based. The system can collect information about a user's energy use via, e.g., questionnaires, self audits with the house monitor, and real time audits based on an audit tool. From these data points and by making use of the tasks module, the system can pinpoint where a user can make an impact on their energy consumption. By coupling a user's personal motivation with their energy priorities, the system can custom tailor an attainable energy savings program for a user.

This initial goal can impact various parts of the system as it motives the consumer to stay on track with their goal. Systems can be put in place to let the user know if they are on or off track for their goal. In one or more embodiments, rewards can be presented to users who have achieved a given goal.

In accordance with one or more embodiments, by implementing known social and community models, the system can help facilitate energy efficiency and conservation through social support and social comparison. Each household can be placed in a cohort group, and the household's consumption is compared to that group. Every customer is part of a community, whether it is externally created (everyone in a user's building, everyone who has a child in the 3rd grade at the local elementary school, etc.) or self organized and not necessarily geographic. Communities help individuals achieve personal goals by naturally coalescing around common goals. Using scientifically based behavioral change, the system can facilitate personal energy consumption reduction through collective action. Communities collectively act on tasks, which can be created by experts and/or active members of the user community. Tasks (insulate your water heater, buy a smart power strip, etc.) are rated and improved upon by individuals who have tried the task and have feedback and/or improvements to add. Individuals can interact with experts both through "Ask the Expert" functionality and through the snapshot tool.

In accordance with one or more embodiments, a Community Newsfeed module is included in a Web portal dashboard, and can be used both to let the consumer know their status relative to their goal and to create a bi-directional communication channel between users, thereby encouraging social interaction and therefore behavior change. An Alerts module provides a communications channel from a power company to a customer. They can then let the user know when there is peak energy demand or can turn down the consumer's thermostat on the consumer's behalf.

FIG. 1 is a schematic diagram illustrating an energy management system in accordance with one or more embodiments. The system is used in a building (e.g., home, apartment, office, or industrial facility). The system includes a House Monitor as part of a Home Area Network (HAN). The HAN is intended to facilitate efficiency improvements for energy consumption. The House Monitor monitors, and then reports, the consumption of energy within the home, apartment, and/or office to a Gateway (base station), thereby informing the customer of consumption trends.

In one or more embodiments, the house monitor can measure AC house current using Current Transformer (CT) sensors that are affixed to, and encircle, the conductor wire(s) (circuits) that are being monitored (e.g., the House Main wires that supply the current and voltage to the house). The data that is collected by the CT and electronic circuitry is then coupled to an internal ZigBee module and protocol. (Although the ZigBee protocol is mentioned in various exemplary embodiments herein, it should be understood that various other wireless protocols can also be used.) The House Monitor ZigBee Module then sends the data to the Gateway using the ZigBee wireless link.

In one or more exemplary embodiments, the Current Transformers (CT) can connect to the House Monitor via phone plugs (similar to those contained on a stereo headset) and sockets. Each plug accommodates two conductors from each CT and the mating sockets are mounted to the printed circuit board located within the enclosure, and can be accessible through access holes in the enclosure wall.

When current in a circuit is too high to directly apply to measuring instruments, a current transformer produces a reduced current accurately proportional to the current in the circuit, which can be conveniently connected to measuring and recording instruments such as the House Monitor. A current transformer also isolates the measuring instruments from what may be very high voltage in the primary circuit. Consequently, current transformers are commonly used in metering in the electric power industry.

Like any other transformer, a current transformer has a primary winding, a magnetic core, and a secondary winding. The alternating current flowing in the primary produces a magnetic field in the core, which then induces current flow in the secondary winding circuit. The primary and secondary circuits should be efficiently coupled, so that the secondary current bears an accurate relationship to the primary current.

The most common design of a CT comprises a length of wire wrapped many times around a split core silicon steel ring which is passed over (around) the circuit being measured (such as House Current). The CT's primary circuit therefore comprises a single 'turn' of conductor, with a secondary of many hundreds of turns. Window-type current transformers such as the CT are common, which can have circuit cables running through the middle of an opening in the core to provide a single-turn primary winding.

Figure 2:
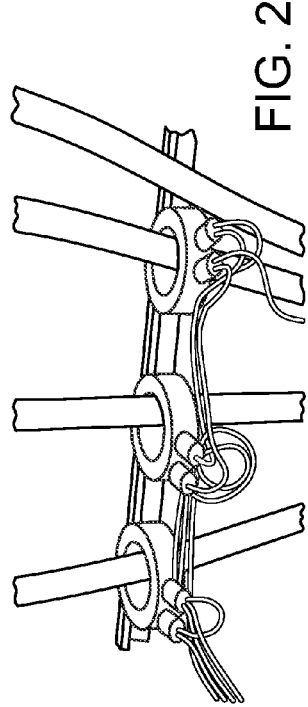
FIG. 2 illustrates an exemplary method of installing current transformers around house mains.

FIG. 2 illustrates an exemplary method of installing CTs around the House Mains.

Current transformers are used extensively for measuring current and monitoring the operation of the power grid. Along with voltage leads, revenue-grade CTs drive the electrical utility's watt-hour meter on virtually every building with three-phase service, and every residence, facility, or commercial building with greater than 200 amp service.

By way of example, the system can use a CT that is manufactured by Magnelab, (model number SCT-0750-100). This CT contains a "burden" resistor and will produce 333 mVACrms with 100 amps of primary AC current. As a result of the house current varying from 0.0 amps to 100 amps, the output voltage will also vary in a very linear manner from 0.0 VACrms to 333 mVACrms. This voltage is then connected via a mono phone plug and socket to the amplifier circuits located on the House Monitor printed circuit board.

In an exemplary embodiment, the House Monitor contains two (and possibly) three generally identical circuits that accommodate two (or up to 12 circuits as an option) independent CTs (FIG. 1 shows two identical circuits). This provides an independent CT as well as a rectifier and amplifier for up to three phases of the building mains. While there are only three identical circuits in the current version of the House Monitor, theoretically there is no limit to the number of conductors that could be monitored simultaneously.

The first Amp stage in FIG. 1 will rectify the AC signal and then couple the rectified signal on to the second Amp stage where it will be amplified. The gain of the first stage is held at unity (Gain=1) to guarantee symmetry of the rectified waveform. The second stage of the House Monitor amplifies the signal by a factor of approximately 3.61 to create a signal that is compatible with the ADC circuits within the ZigBee Module.

The signal output of the second stage (of each rectifier/amplifier circuit in FIG. 1) is then passed to the two pole resistor-capacitor (R-C) filter network where the signal is smoothed into a DC voltage. The corner of the RC filter is below 1 Hertz, so the ripple has been reduced to a point of creating a relatively clean DC signal. This DC voltage signal is then transferred to the analog to digital (ADC) input circuitry within the ZigBee module.

The 10-bit ADC circuits within the ZigBee module convert the analog signals to a digital circuit. As the DC levels change, the digital levels change proportionately. That is, the digital levels can vary in equal step values from 0 to 1023, ranging from an input DC voltage of 0.0 volts to approximately 1.20 volts. The digital levels are then transmitted via a wireless link to the gateway via the ZigBee protocol. Once the gateway has received the wireless signal and has recovered the digital level from the wireless signal, the digital level can then be further processed for transmission to the server via the Internet. The data can then be utilized to determine the House AC current for the purpose of determining the house power consumption.

Figure 3:
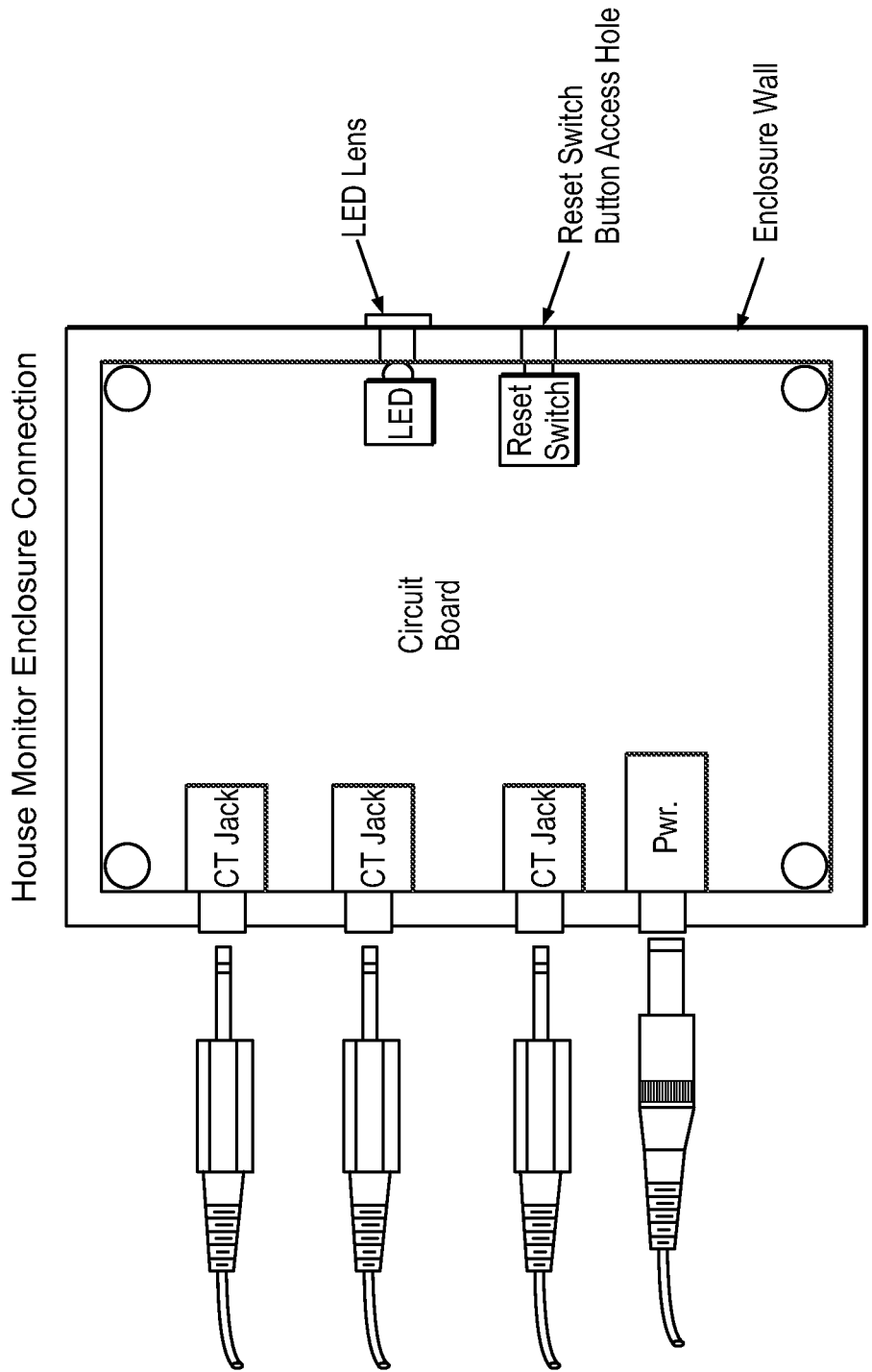
FIG. 3 illustrates a house monitor enclosure in accordance with one or more embodiments.

The House Monitor can be mounted on any surface near the House Mains and/or the panelboard. By way of example, the length or the twisted pair wires is approximately eight (8) feet long and the power supply wires is six (6) feet long. Each of the plugs is inserted into a mating socket (jack) and is held in position via a friction fit. The sockets/jacks are mounted directly to the circuit board and are accessible through the enclosure wall. These connections are connected as shown in FIG. 3 (shown with a third CT).

Figure 4:
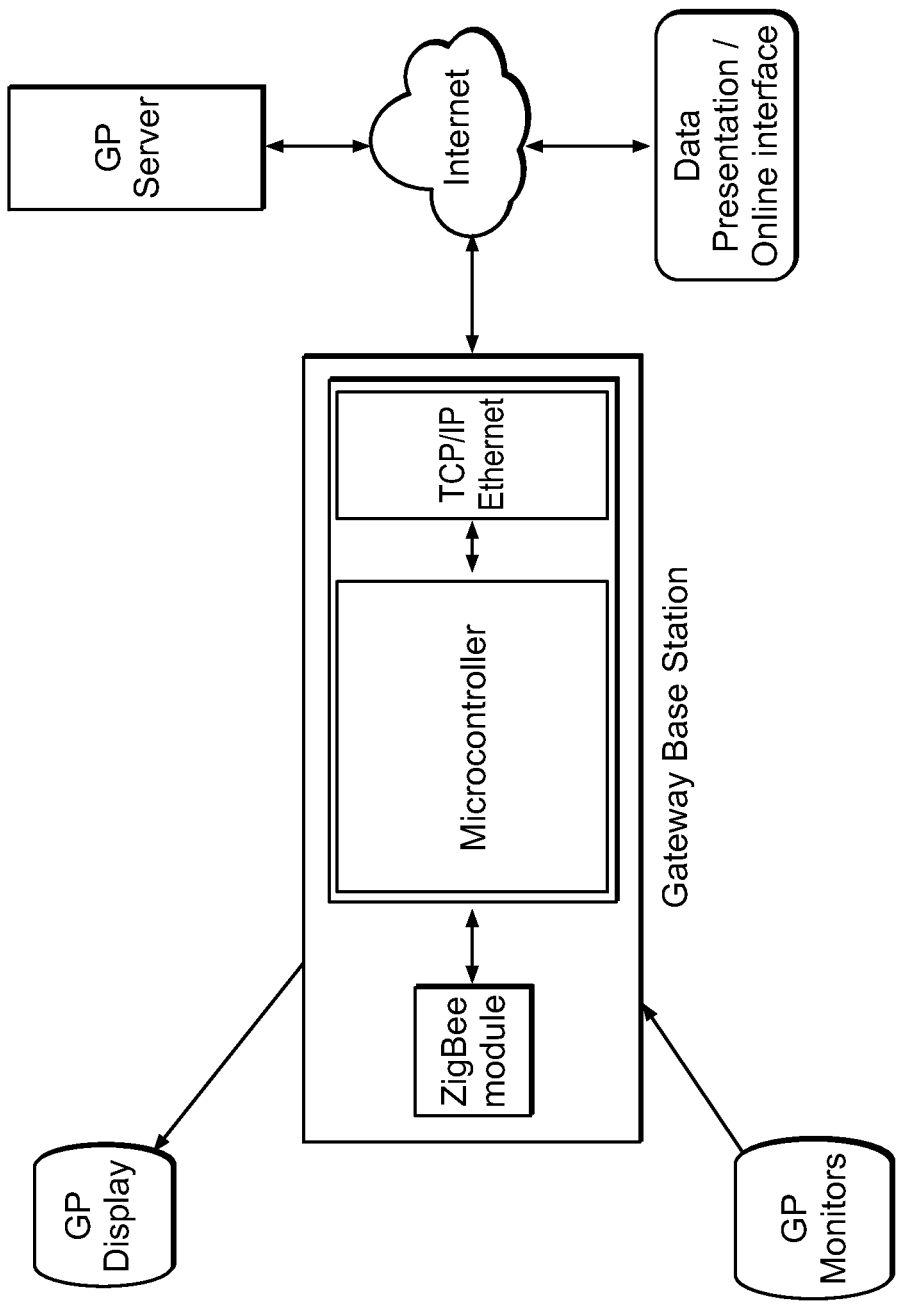
FIG. 4 is a system block diagram illustrating an exemplary end-to-end system, showing a gateway in accordance with one or more embodiments in greater detail.

FIG. 4 is a system block diagram illustrating an exemplary end-to-end system, showing the Gateway in greater detail. Monitors feed utility usage information to the Gateway via ZigBee wireless links, and this information is processed with a set of Python programs and delivered to the Server online via TCP/IP in XML format as well as to local displays via ZigBee.

In the exemplary embodiment, the gateway can comprise a third party product that operates with custom software developed for the product. By way of example, the Gateway is a product from Digi International. It is a ConnectPort X2, Ethernet, X2-Z11-EC-A.

The Gateway can be used in any building. In the exemplary embodiment, it is particularly suitable for use in including houses, apartments, offices or small industrial facilities. The Gateway is part of the Home Area Network (HAN). The HAN is intended to facilitate efficiency improvements in energy consumption. The Gateway gathers and reports energy consumption within the home, apartment, and/or office to the Server and Display Units to inform the customer of consumption trends.

The Gateway receives data via a ZigBee module, processes that data in a number of ways, and then uploads information via TCP/IP to the Server. In addition, the Gateway receives information downloaded from the Server and combines it with local data fed to various Display Units on the HAN. In one or more embodiments, it may also communicate using the ZigBee Smart Energy Profile or another device networking technology to smart appliances, smart plugs, and smart thermostats for individual device monitoring and load control.

In the exemplary embodiment described below, the software for the Gateway is written in the Python programming language. It includes open-source libraries for posting information on the Web via Hypertext Transfer Protocol, parsing URL addresses and making File Transfer Protocol connections. In addition it uses proprietary libraries for making socket-type connections and API type connections to ZigBee radios, as well as issuing commands to the underlying operating system. Software may support ZigBee Smart Energy Profile, Z-wave, 6loPAN, ZigBee over WiFi or any other device networking technology. There are a number of component functions performed by the Gateway software including a bootloader, memory monitoring, time lookup, network mapping, device setup, obtaining monitor data, processing data for displays, processing data for uploads, uploading data to the server, receiving messages from the server and a variety of supporting functions such as those for creating and reading communications in XML format.

Figure 5:
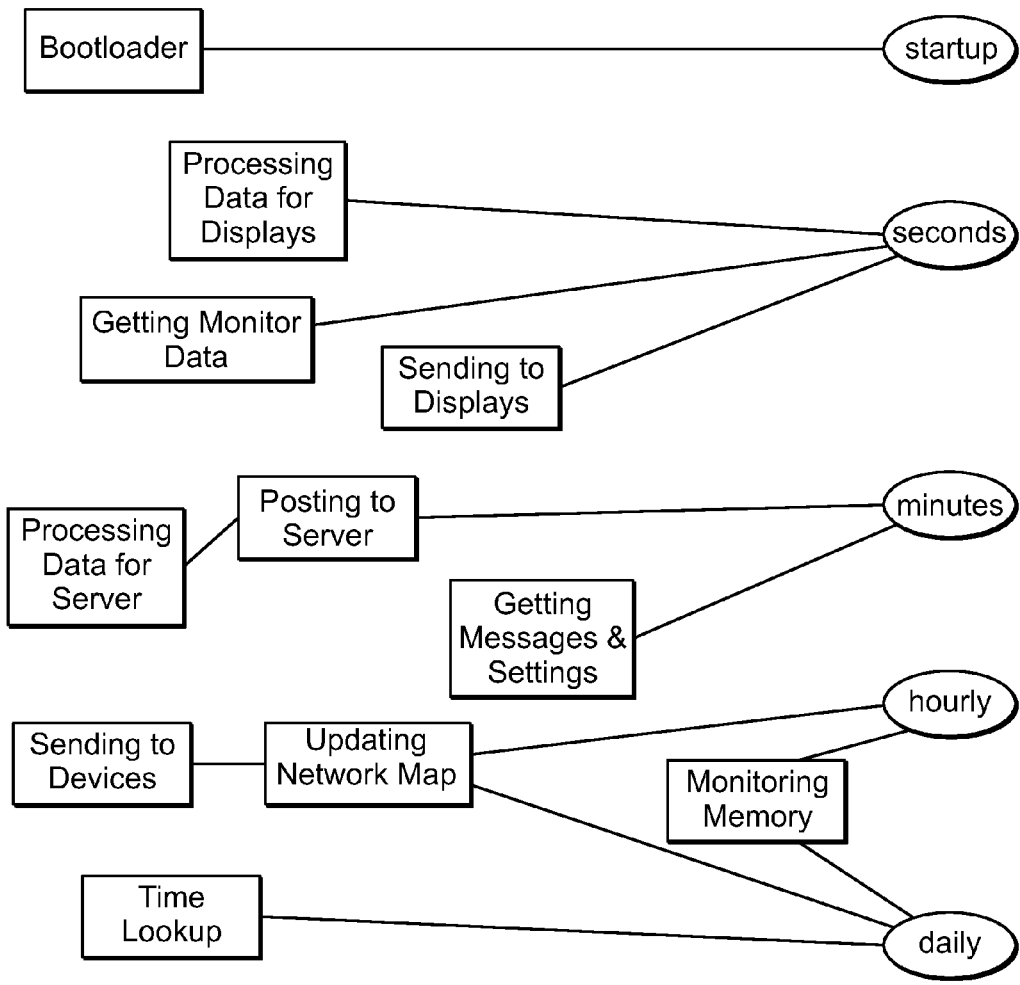
FIG. 5 illustrates basic software tasks and timing for processes in the gateway in the accordance with one or more embodiments.

FIG. 5 illustrates the basic software tasks and timing for each process in the exemplary embodiment as discussed below.

On startup, and possibly periodically thereafter, the Gateway software version can be automatically checked against the latest version assigned to that device on the Server. The local version information is loaded from a specific firmware file stored in the operating system. An HTTP connection can be made via the GET method that identifies the unique device. It requests the latest software version, an FTP path to that version, and whether or not to download the latest version at that time.

If the server directs the device to initiate a new version download (or to re-download the existing software version), the Gateway makes a connection to the FTP path and downloads all files in that directory, with the new version indicator file being the last to be downloaded. This means that the device only detects that the update was successful if all files have been downloaded. At the end of this process, the Gateway is automatically rebooted.

If the server does not indicate that a new download is required, the bootloader process exits without making any changes to the file structure.

Software files can also be uploaded using various other Internet cloud technologies that maintain an open TCP/IP socket for this purpose.

When the main program begins, a record is made of the free device memory. Periodically thereafter, on every attempt to record data, memory is checked to make sure there is enough available. As long as 10 percent of the initial memory is still free, the software will continue to record data, otherwise it will skip recording new data until an upload can be made to the server.

A Python garbage collection routine can be requested on an hourly basis, to ensure that any inefficient use of device memory is periodically corrected.

Free memory statistics can be uploaded to the server with every set of data posted, in case this information is useful for tracking down device problems in the future.

At startup, and on a daily basis thereafter, the Gateway makes a connection to one of a group of Simple Network Time Protocol (SNTP) servers and retrieves an accurately updated Coordinated Universal Time (UTC) stamp. This time stamp allows a calculation of the current time using the devices internal runtime clock.

If no time server is found on startup, the Gateway retries every ten seconds until it gets a response, since the software requires accurate time for other functions. After that, any connection failures simply cause the time update to be retried on the next scheduled check.

At startup, every five minutes for the first two hours, and every hour thereafter, the Gateway polls the local wireless network for information from responding nodes (display and monitoring devices). The responses to this poll are recorded in a local database in memory, so that the Gateway is aware of all devices currently participating in the network.

Polling can be done more frequently during the first two hours to pick up new devices more rapidly during installation or testing of the home area network. It can also be triggered when devices send a joining message at startup.

On a daily basis, the Gateway completely refreshes its network map, to remove any old nodes that might otherwise remain in cached memory. This ensures a high probability of checking all existing devices but not devices that have been permanently removed from the network.

Each time a network mapping event takes place, it is followed by a remote device setup process to ensure that each of the devices found is properly configured. Customized setup commands are sent based on the model of device to ensure that each can properly rejoin the network, sleep cyclically together and that these settings are retained by the devices even if their power is cycled on and off. Additional commands can be added to this procedure as needed, when new devices are created for the system.

Power monitoring can be performed by House Monitors, Appliance Monitors, and other utility usage monitoring devices. By way of example, these devices can be polled every two seconds, and respond with one or more measurements of electrical current (or other utility usage). These responses are stored in memory and aggregated for various types of output.

Monitoring devices are selected for polling based upon the information generated by the network mapping processes. Polling may also happen remotely using technologies like advanced metering infrastructure or automated meter reading, supplying the Gateway with data via an online download.

Two different polls are conducted, one for remote upload to the Server and online display, the other for local graphical display of usage data. These polls happen at different frequencies and for different purposes, so the processes are independent.

Monitoring data is processed and transmitted for presentation on local displays by the Gateway. This processing is dependent on the type of display and the information needing to be transmitted.

For exemplary displays, like the GLANCE power meter (which is described in further detail below), a frame of data is generated every several seconds that is transmitted to any appropriate devices discovered during network mapping. These commands are specific requests to configure visual and sound outputs on the receiving device, so that LCD or LED outputs can be switched on and off to generate a usage graph and message alert functions.

Received data is processed and transmitted to the Server to feed the online user interface systems and for archiving purposes. This processing happens as needed, based on the data batch size. For example, this can happen once per minute.

Data about the Gateway, identifying information about the monitoring sensor units and the usage data itself is compiled into a plain-text XML structure that also includes simple averages to reduce the processing load on the central Server. Debugging data can be included in the XML format so that information about runtime and memory use can be recorded to help with troubleshooting problems if needed.

The XML data is passed via a queue to a threaded process for uploading.

Threaded processes handle all regular uploads and downloads from the Server, so that delays in server communication or response do not interrupt local monitoring and display functions. These threaded processes read from queues to retrieve XML batches for HTTP POST to the Server. Threads launch on startup, and constantly monitor the queue for new data.

If a POST fails for any reason, the XML batch is returned to the queue and the connection is retried until the batch can be delivered.

Once a POST has been made successfully the Server returns a success message, along with other status information. If a success message is received by the Gateway, the XML batch is deleted from the queue, as it is no longer needed and its memory can be recovered.

Other threaded processes parse the status information received from the server on a regular basis. This status information includes the unique ID of the House Monitor assigned to that site, the current multiplier for turning raw readings into measures of energy, a scale for metering devices that require one and message information for displaying alert lights. All of this status information is delivered in XML structures.

The XML status information is parsed locally and put into variables so that it can be retrieved when needed by the various calculation and display processes that drive the local output devices. In some embodiments, additional information can be downloaded in the same format, to drive other output devices such as thermostats and appliance power switching.

The Gateway can use a variety of supporting functions such as those for creating and reading communications in XML format, SNTP request and parsing functions, and other methods generally available and used by programmers to support similar types of functionality in software.

Because of the bootloader functions, improvements and new functions can be added to the Gateway as needed.

Figure 6:
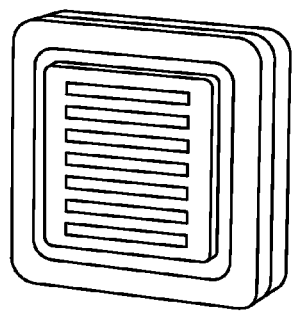
FIG. 6 illustrates an exemplary display in accordance with one or more embodiments.

FIG. 6 illustrates an exemplary display in accordance with one or more embodiments. The display (which is referred to herein as the GLANCE display) can be an LED display used in any building including, homes, apartments, offices, and industrial facilities. The GLANCE display functions as part of the Home Area Network (HAN). The HAN facilitates efficiency improvements for energy consumption in the building.

In accordance with one or more embodiments, the GLANCE display reports energy consumption in the form of a bar graph. The GLANCE display also displays the user's goal state or status through the color of an illuminated ring. The display is preferably lightweight and small, allowing it to be placed virtually anywhere in the building. The display can be simple, just giving a user a quick visualization of the household's power consumption in real-time. When the goal ring flashes red, or the display's buzzer sounds, it alerts users to messages from the Utilities and the system server.

In accordance with one or more embodiments, the GLANCE Display includes a circuit board that acts as a motherboard, containing a microprocessor, LEDs, voltage regulators, various electric circuits and components, as well as a ZigBee module. The ZigBee module links with and receives data from the Gateway ZigBee module. The motherboard attaches to an enclosure front cover, and locates the LEDs against the inside of the front cover and light-pipes, in a recessed area.

The GLANCE Display software can reside on the microprocessor. The software can control the bar graph displays, the message indicator/goal state LEDs and the audio buzzer. The ZigBee radio can be configured to automatically communicate with the HAN system. Over-the-air firmware updates can also be utilized for upgrading the software after installation.

In accordance with one or more embodiments, the Server imports content from the real time energy consumption monitors, and hosts a Web site that can be accessed by users through client devices. The server uses the data to create energy savings interventions with the consumer using in house displays, web, email and mobile interfaces. Interventions include profiling, task assignment and maintenance, community and cohort comparisons, real time feedback. In exemplary embodiments, the Community server can include the components described below.

In one or more embodiments, the first time a user accesses the Web site by entering their log in name and password, they are taken to the Intake screens. The intake page can allow a user to choose a screen name, specify the size of their home or building. In addition, the user can specify how many adults and how many children live in the home or building. The total number of people living in the home can be used to determine the cohort group that the user is placed in. The community is defined by every user that is related to a particular client. Cohorts, on the other hand can be 'similar households,' e.g., that have the same occupancy numbers. The community server can then compare a user to people like them and give an accurate estimate of how much power is being used, relative to the user's savings goal.

FIG. 7 is a screenshot of an exemplary "savings goal" screen presented to users in accordance with one or more embodiments. By way of example, a user's default savings goal can be set at 15% prior to them accessing the site. When the user accesses the site for the first time, he or she can choose to change a savings goal. This page also provides users with an indication of what their savings would be at each goal level, and a level of difficulty.

Users are allowed to change their goal periodically, e.g., on a monthly basis. They can adjust it if they find it to be too easy or if they have set too aggressive of a goal.

FIG. 8 is a screenshot of an exemplary introduction audit screen in accordance with one or more embodiments. The audit includes several sections, broken down by category and including dropdown, multi-select and numeric question types, resulting in a detailed understanding of a users' home energy use. The introduction page sets the stage for the audit, providing the user with an overview of the sections they will need to complete.

The "Your Home" section includes background questions about a user's home. Some of the questions are used for reporting purposes, e.g., "How long have you lived in your home?" Others will determine the questions that will need to be displayed in a later section, e.g., "Do you have central air conditioning?" (If the user indicates "yes", a set of air conditioning questions will appear in the Heating and Cooling section of the audit).

Users can be asked to provide information on the number of bulbs and bulb types (incandescent, fluorescent, etc) for each room in the home, plus outside lighting.

Users can be asked to provide answers to detailed questions about their kitchen appliances to determine energy use, (e.g., "Is your primary refrigerator an energy star model?" "How large is this refrigerator?" and "How old is this refrigerator?"), and estimates on usage where appropriate, e.g., "How many minutes per day do you use your microwave oven?"

Users can be asked detailed questions about their use of heating and cooling appliances. There will be fewer questions if the home does not have central air conditioning, fans, etc.

Users can be asked questions about Home Entertainment (e.g., TV type and hours used per day) and Computers (types, and use per day).

Users can also be asked to provide information laundry use, and miscellaneous appliances such as dehumidifiers and pools and hot tubs, if applicable.

Once a user has completed the audit, the results are compiled and a set of rules around individual responses to the questions are applied so that recommended energy-saving actions can be proposed for consideration. This includes calculated potential savings, and the ability to add the actions to the Savings Plan. By clicking on "More", users can read a more detailed description of the action. FIG. 9 is screenshot of an example of a savings plan presented to the user. The screen can be accessed at any time that a user wants to review their recommended actions.

Figure 10:
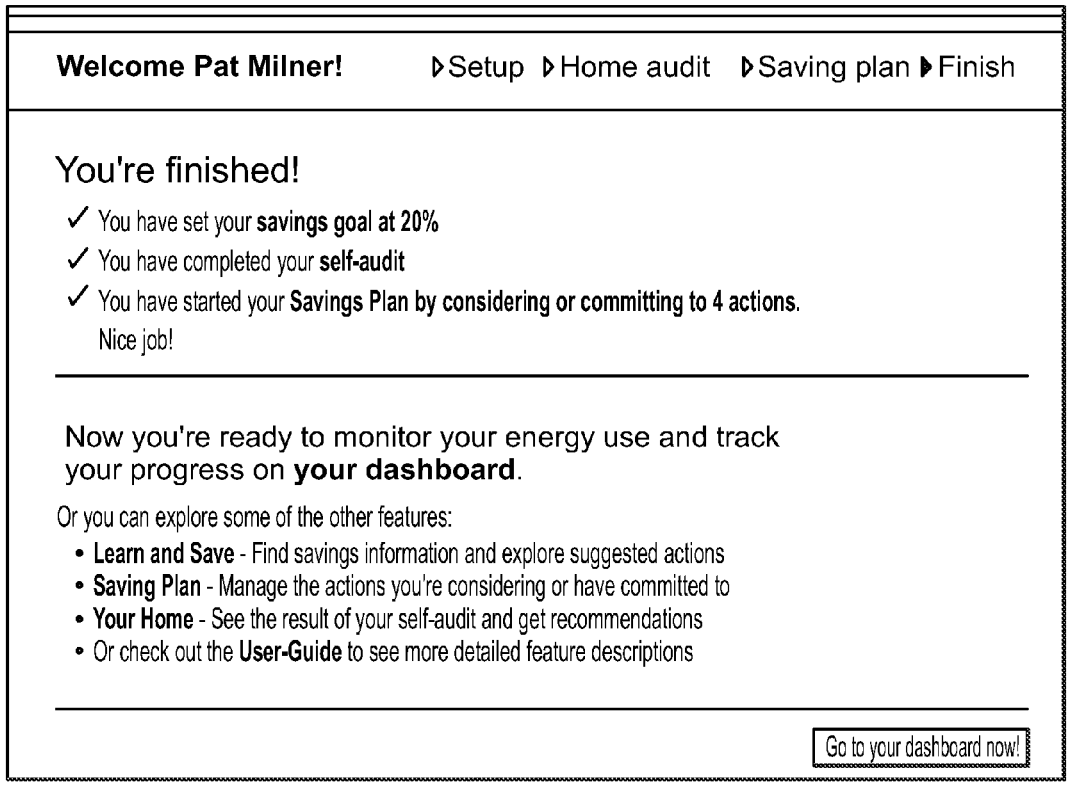
FIG. 10 is a screenshot of an example of a final screen of the intake and audit process in accordance with one or more embodiments.

FIG. 10 is a screenshot of an example of a final screen of the Intake and Audit process, which congratulates the user for completing the intake steps, and presents them with some recommended Next Steps as they enter the website for the first time.

Figure 11:
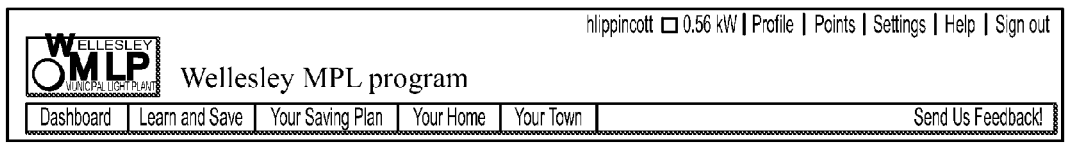
FIG. 11 is a screenshot of a sample navigation box in accordance with one or more embodiments.

Once intake is completed, users will see the navigation box shown by way of example in FIG. 11 when they are logged onto the site.

The site is organized so as to be easy to navigate. In one or more embodiments, there are five main sections of the site:

Dashboard: This is the users' main control center and the first page they see when they log in.

Learn and Save: This is where users can find actions, read expert posts, and browse snapshots.

Your Savings Plan: This page summarizes the actions that have been signed up for, with a calculated potential savings value.

Your Home: The page provides detailed results of the home audit completed during intake, including comparisons within the home against different categories, as well as against similar households.

Your Town: Users can participate in the town discussion forum, see a list of the other users in their town. Also, when Challenges take place, they can be managed on this page.

In one or more embodiments, users are presented with content in the form of suggested actions, next steps, user guides, etc. Once they are engaged in the site and make use of some of the features such as snapshots and expert advice, they will start to generate their own content, as well as engage with other users on the site. Social and expert support are combined to provide a comprehensive community, and tools such as the snapshot tool encourage people to create content on the site organically.

FIG. 12 is an example of a portion of a user guide in accordance with one or more embodiments.

Figure 13:
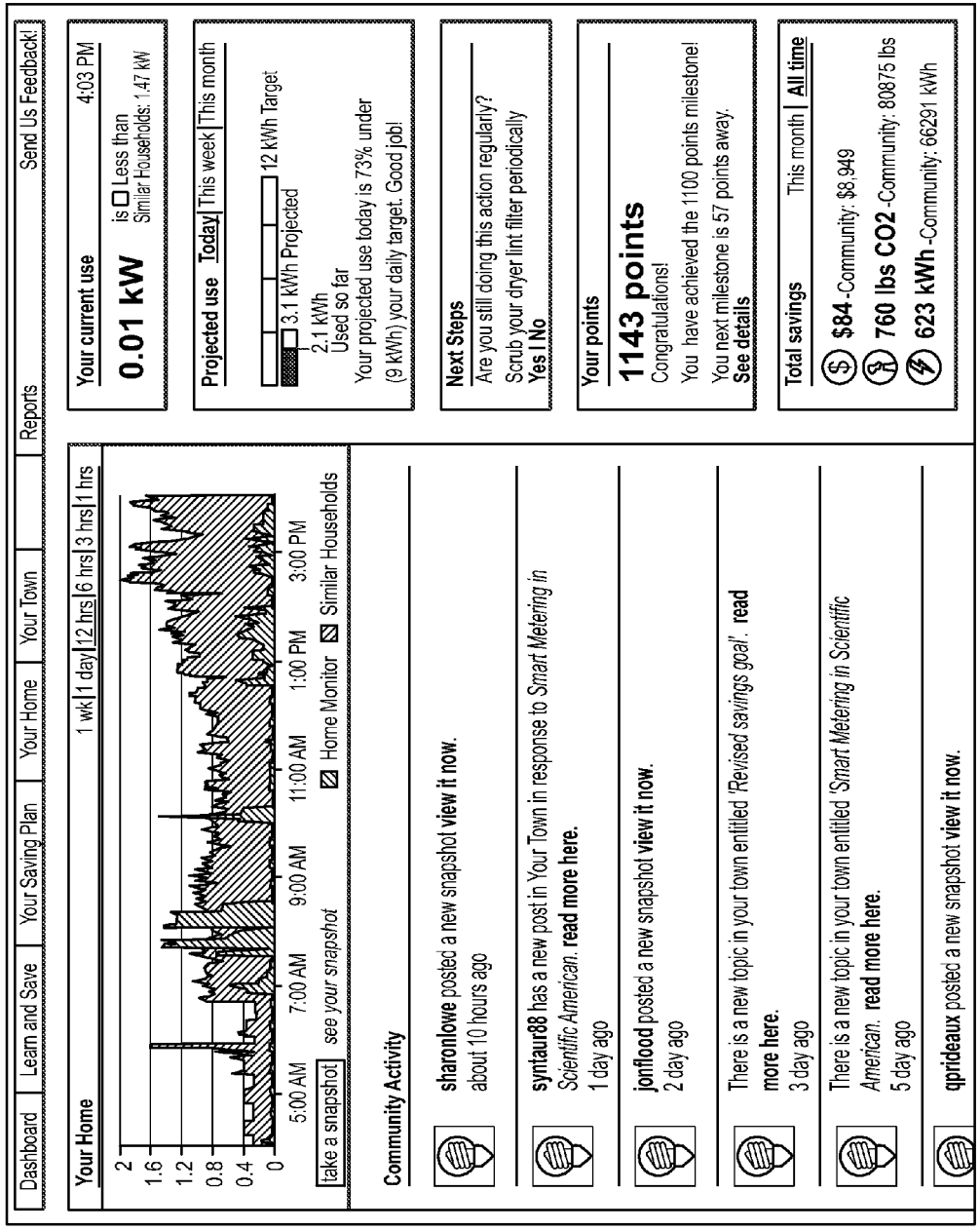
FIG. 13 is a screenshot of an example of a dashboard in accordance with one or more embodiments.

FIG. 13 is an example of a dashboard in accordance with one or more embodiments. The Dashboard is the users' control center for their site activity. It is the first page they come to each time they log into the site, and it provides them with their results, next steps, and a continuous stream of updates to let them know when content is being created. It also provides them with information if their monitoring system is experiencing problems, so that they can follow the troubleshooting steps and contact the system support team if needed.

Figure 14:
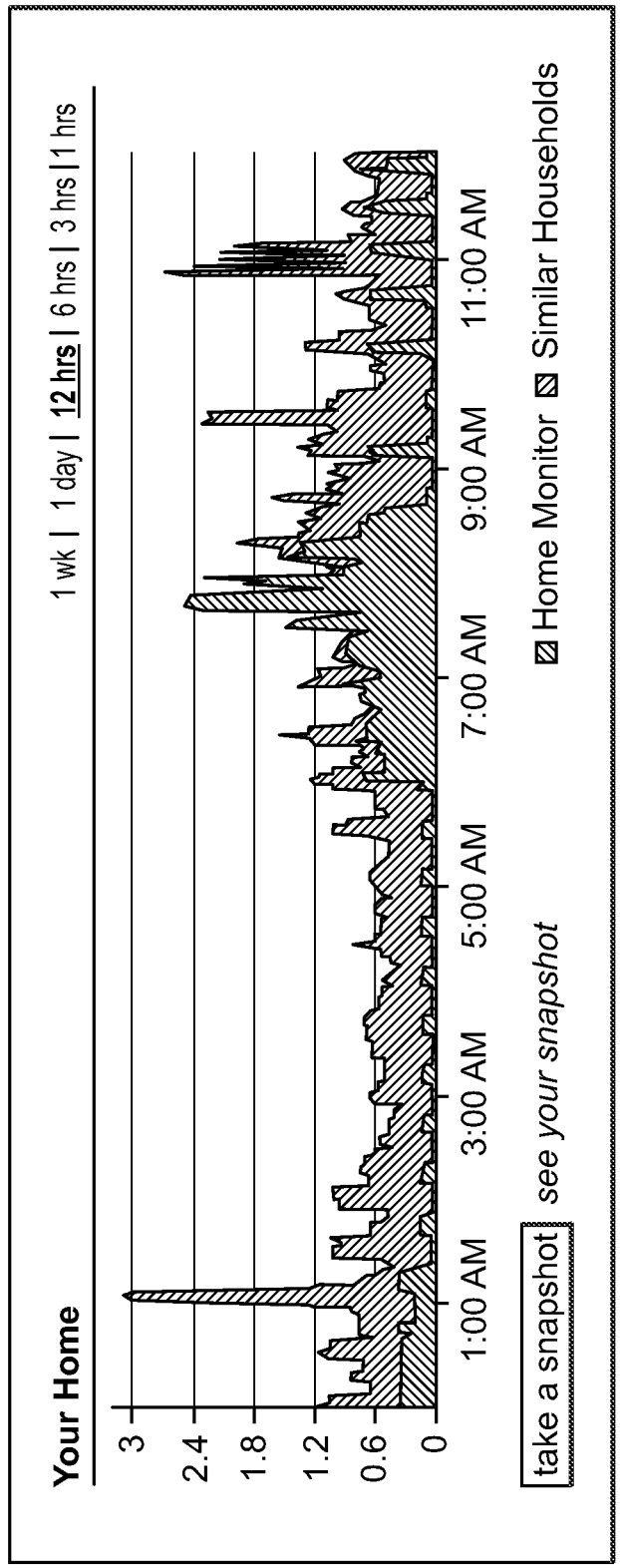
FIG. 14 is a screenshot of an example of a home monitor graph in accordance with one or more embodiments.

FIG. 14 is an example of a home monitor graph in accordance with one or more embodiments. The home monitor graph provides real-time data on energy consumption. Every minute the graph is updated to provide a kW value, as well as a line for "Similar Households" (homes that have the same number of occupants in their town/group). Users can view the data graph for a number of different time periods by click on the links next to the graph: 1 week, 1 day, 12 hours, 6 hours, 3 hours and 1 hour.

Figure 15:
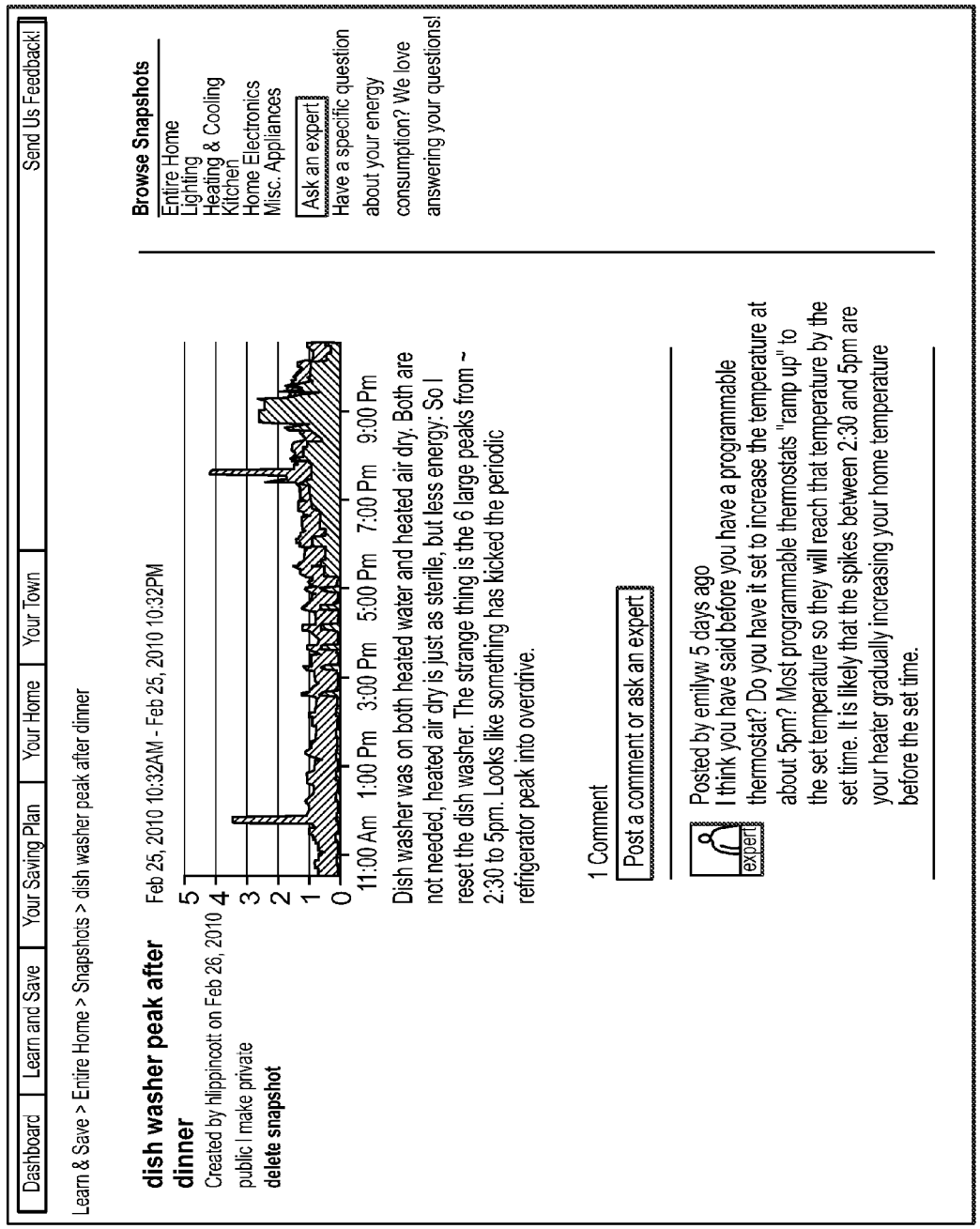
FIG. 15 is a screenshot of an example of a snapshot in accordance with one or more embodiments.

Snapshots provides users with a channel for creating content as shown in the example screenshot of FIG. 15. Users can take a snapshot of their home energy use for a given time period. They can also annotate snapshots with notes and ask questions of the experts that monitor the site. By clicking on the "take a snapshot" button within the Your Home graph, users can enter a title and notes, choose a type, flag the snapshot as public or private, and indicate that they would like to ask the expert a question. Once created, the snapshot will appear within Learn and Save for other users to view and comment on (as long as it was flagged as public).

Figure 16:
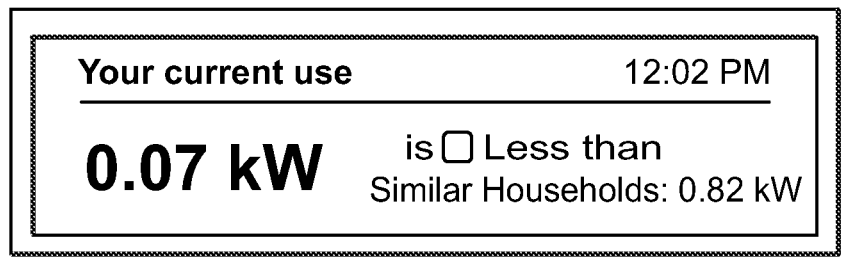
FIG. 16 is a screenshot of an example of a current use box displayed to a user in accordance with one or more embodiments.

FIG. 16 is an example of a current use box displayed to a user, which shows users the value of the current kW use in their home. This is compared to similar households. Users will see a green smiling face if they are using less energy than similar households.

Figure 17:
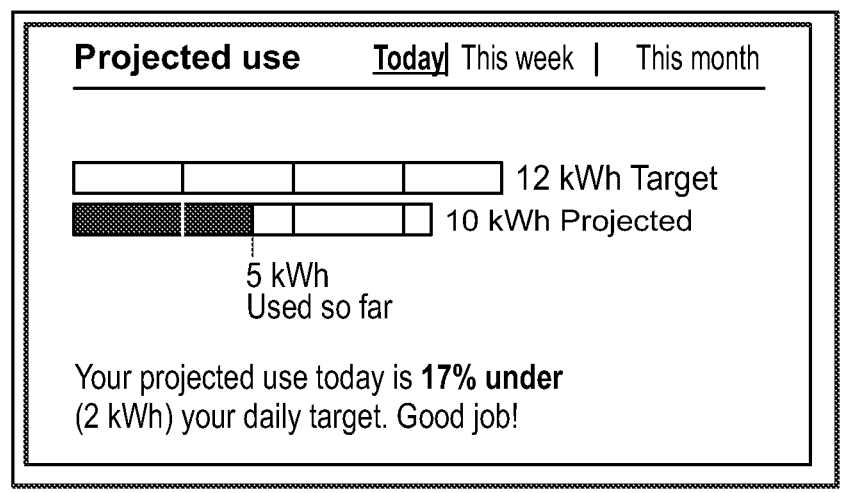
FIG. 17 is a screenshot of an example of a projected use box in accordance with one or more embodiments.

FIG. 17 is an example of a projected use box, which shows how a user is doing relative to their goal, for the day, week or month, depending on the time interval selected across the top. In the "projected use for today" example below, the gray line across the top shows the target for today (last year's consumption for this day adjusted by a user's goal), the dark blue line shows the energy used so far today, and the light blue shows the expected projected consumption for the day. At the bottom there is an indication of whether the user is expected to reach their target or not, and if so, by how much.

If a users' projected use is above their target, they can be notified to take action to reduce usage. Users can be provided with a "Take Action!" link that takes them to a page that outlines small steps they can take to reach their target for the day, e.g., "Use a toaster oven instead of an electric oven (1 kWh, 20 min toaster oven vs. 1 hr in oven)" or "Air dry a load of laundry instead of using your dryer (3.3 kWh, electric)".

Users can be provided with points when they meet energy usage goals. The website can show a box that provides a summary of a user's points total, including which milestone they have reached, and how far away they are from reaching the next one.

Users can be shown a total savings box that shows how the user's energy saving activity has been adding up, both for the current month and for all time. Savings results can be presented in multiple units including money, lbs of $CO_2$, and kWh. Community totals can also be provided, which covers the entire town.

In accordance with one or more embodiments, a Community Activity Newsfeed is provided as shown in the example of FIG. 18. The Community Activity Newsfeed allows users to easily see what content and activity is taking place on the site. All new content generated by other users (snapshots, comments, expert posts) are listed here, providing they have been approved and flagged as "public". The exception is any content posted within "Your Town." In some embodiments, users are only alerted to posts by people in their own town, and they will not see activity by users in other towns.

In addition to the final page of the audit, users can be provided with a suggested path for using site features in a Next Steps box. Each next step item has a rule and a priority within the database. The Next Steps box only appears in the Dashboard if users meet the criteria to see a Next Step. Users can, e.g., be encouraged to complete their audit, create a snapshot, sign up for actions, upload a photo, etc:

Users can also be encouraged to research energy-saving actions to add to their savings plan, browse through the expert forum, and take a look at other users' snapshots to see what they have been learning about their homes. This can be viewed for the entire home, or filtered by category.

Actions can be tied to a user's audit responses, so only actions that are relevant to them will be displayed. For example if a user does not have a hot tub they will not see the hot tub actions on the site. Actions can be one-time tasks, such as cleaning your refrigerator coils, or long-term habit changes, such as air drying your clothes instead of using a dryer. Users can browse "Suggested Actions." Alternatively, a user can see all actions, or view actions as a list by category.

Figure 19:
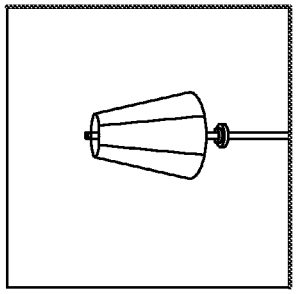
FIG. 19 is a screenshot of an example of an action detail page in accordance with one or more embodiments.

The action detail page (an example of which is shown in FIG. 19) provides an annual savings estimate, an estimated cost to complete the action, a more detailed action description, a list of the assumptions made when calculating the savings, and any relevant references. It is also possible to see how many people have committed to the action. Users can comment on an action. The comments are use used to ask a question or share personal experiences from engaging with an action.

In one or more embodiments, users can ask questions to experts about their energy use and appliances in a threaded discussion that others can also view and participate in, as illustrated in the example Web page of FIG. 20. This feature gives users easy access to experts, while also providing a new channel for content development and educational information.

In one or more embodiments, users can see all the snapshots that others have created, both overall and broken down by category. They can view all the comments that have been made, and also post their own.

The website can post poll questions for users to answer. These questions will be used to check in with the users, provide a fun distraction, ask users opinions collect information for the client, and also to generate new content for the community. The questions might be open ended, or multiple choice, and will appear on the dashboard. Once the user has responded, the question will disappear and they will be able to view a summary of the results.

Figure 21:
FIG. 21 is a screenshot of an example of a savings plan page in accordance with one or more embodiments.

FIG. 21 is an example of a Savings Plan page, which details the actions that the user has considered, committed to, or completed. The total estimated savings of committed and completed actions are presented at the top of the page, along with the goal that the user set, with an indication of whether actions are more or less than user goals (i.e., whether they are likely to reach or exceed their goal by completing the actions in their list).

It is possible to change the units for the page by clicking on the text links under the goal chart, so that estimated savings can be viewed in kWh, dollars or pounds of CO2.

Figure 22:
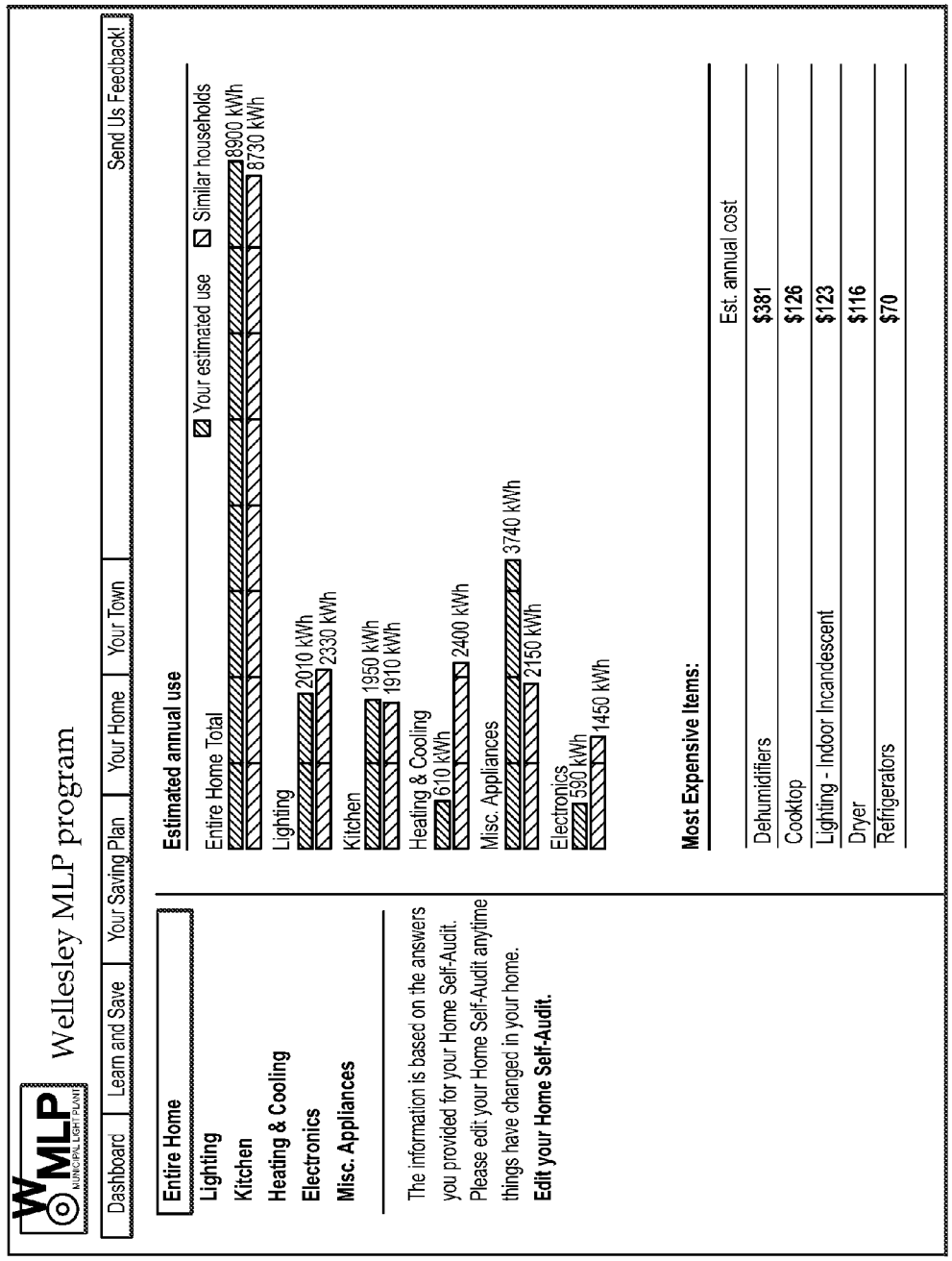
FIG. 22 is a screenshot of an example of a "Your Home" page in accordance with one or more embodiments.

The "Your Home" page (an example of which is shown in FIG. 22) provides the results of the audit that was either completed during intake or in the course of site use. The bars at the top show how the user's total annual energy use compares to similar households, and also how their total consumption breaks down by category (Lighting, Kitchen, etc). Each category total is also compared to Similar Households. Below the bars, it is possible to see the cost of the top appliances within their home. By clicking on the categories on the left-hand side, users can view a detailed breakdown of their consumption by category. For example, within the Kitchen category they can see how much energy they use with their cooking and refrigeration appliances. The Most Expensive Appliances list within each category is presented.

If a user has not yet completed their audit, they can be presented with sample content whenever they access the Your Home section of the site, and they won't be able to view any of their results until they complete the audit.

Users that do not have any actions in a "considering" "committed" or "completed" status in their Savings Plan, will be presented with a link on the left-hand navigation bar of the My Home page that will take them to the End of Audit Savings Plan page.

The "Your Town" page (an example of which is shown in FIG. 23) provides users with the opportunity to see how their town is doing. The number of participating households is shown, along with overall savings metrics for the town. The top savers for the town are listed, with a percentage savings over the same time the previous year. A discussion board enables users to post messages and respond to each other. Finally, they are able to view a list of their neighbors.

Challenges can be run for any population within the system, e.g., a town, or across towns. A goal (e.g., to save 15% within the next 30 days) or challenge (e.g., who can save the most within the next 30 days) is set and communicated to the population via email, Dashboard alerts, the Community Newsfeed, etc. Users can view interim results within the Your Town page, which will also be announced within the channels listed above. Once the challenge is completed final results will be communicated, and prizes, if appropriate, will be distributed.

Figure 24:
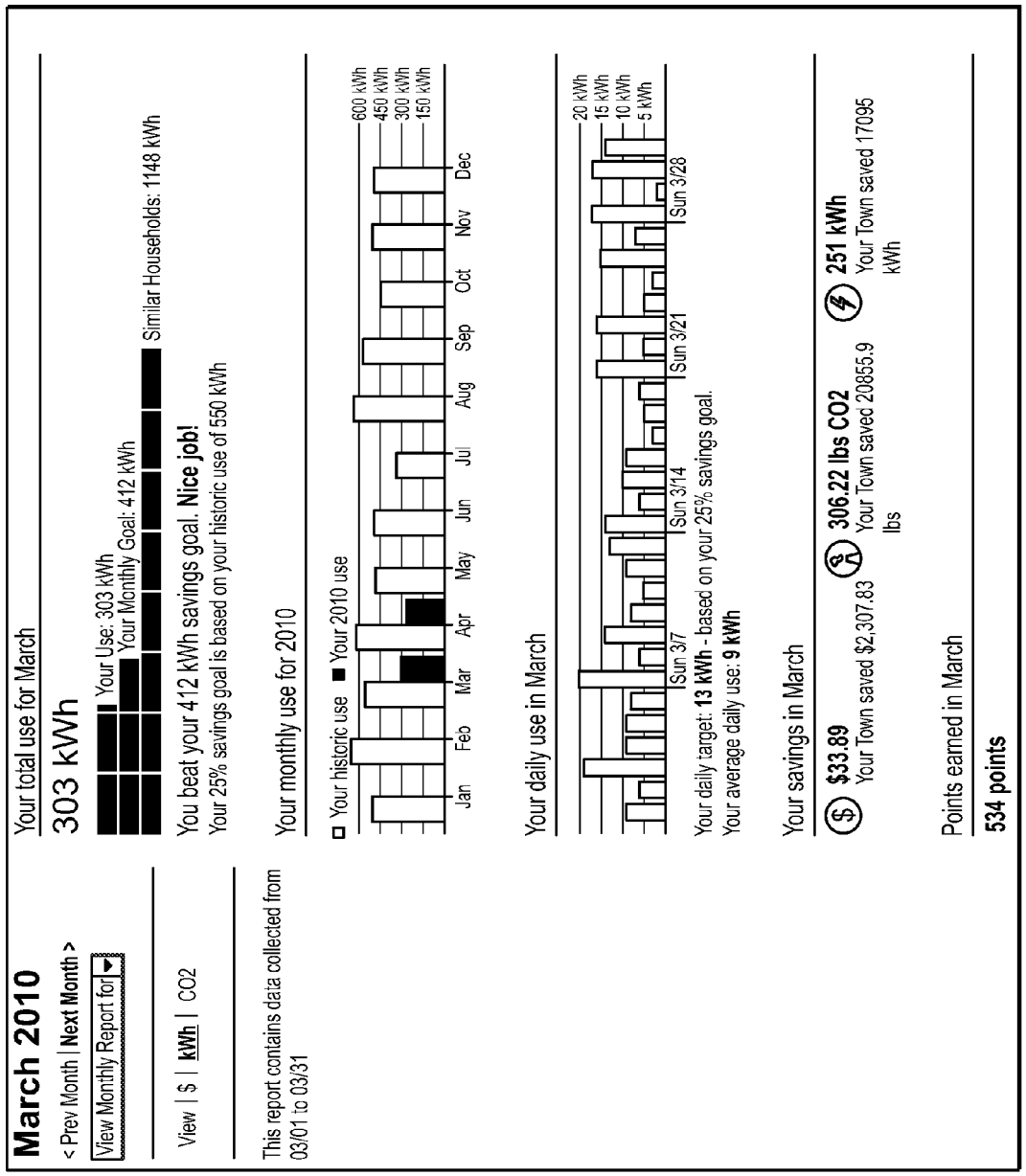
FIG. 24 is a screenshot of an example of a reports page in accordance with one or more embodiments.

The reports page of the site (an example of which is shown in FIG. 24) shows the user multiple metrics by month including electricity usage, progress to goal, savings information and daily usage breakdowns. This information is also shown by town and for the whole community. When a user logs in to the site for the first time, the reports tab will not yet be available in the main navigation. Reports are generated and made available after a user has completed one full month in the program.

If a user has incomplete data for a month due to hardware problems or internet outage, the system can estimate the daily usage for the missing days using available data. If a user is missing more than 10 days of data for a single month, a report is not be generated for that month.

Reports can be viewed in multiple units by clicking on a 'View by' link on the page. They can be re-configured to show kWh, dollars, or lbs of CO2.

The total use section of reports shows a user how much electricity they used for the month. In an exemplary embodiment, three bars are shown. A user's total use, their target usage (goal) and how much similar households used in the same month. Congratulatory messaging is presented if a user has met their goal for the month.

This "This Year" chart shows the user an annual view, how their use compares to their usage from the previous year on a monthly basis.

The Daily Use chart gives the user a daily breakdown of their use for the month. There is also a daily target and the chart shows how many days in the month the user has met their daily target.

The Total Savings section of the monthly report shows the user how much they saved for the month in question using multiple units. Town and community information is also presented encouraging the user by showing them how much collectively has been saved.

The Points Earned section of the reports show the user how many points they have earned for the month. Earnings are broken down by participation (logging in, posting to the forums, etc.) and pure savings that is using less than the previous year and meeting their goal.

In accordance with one or more embodiments, a public page can be provided for user, allowing other people in the community can learn about them. It can be accessed when a user clicks on another user's screen name from a Community Newsfeed item, Points page or Your Town. A users' profile can include a photo, location, "about me" blurb, savings goal, Points total (broken down by savings and participation), and a list of their actions. Users can manage what appears on this page by clicking on the "Settings" link.

A Points page can provide a summary of the points activity for the user. A detailed list of recent activity can be provided to explain how points have been accruing. For example, for every day that a user is below their daily average from the previous year by a certain percentage, they get that many points, up to a maximum of 20 per day. If they used, e.g., 15% less than last year they get 15 points. Users can also receive points for activity on the site, including logging in, posting a question to the expert, or commenting on an action, expert forum thread or town discussion thread.

A leader board for points can be displayed on the points page, preferably in a rolling seven day and 30 day format, so that users who have enrolled in the site at a later time are not penalized. Partnering with the clients, points can be tied to incentives. Incentives can include social recognition points or rewards tied to third parties that can be redeemed via a mobile device operated by the user.

By partnering with clients, points can be tied to incentives. Points could be redeemed, e.g., for a cash prize or an energy efficient appliance. Monthly contests can be held encouraging users to save energy.

Communications from the community server to users can be made by various electronic means, including email. These communications are used to reach out to users, make sure they are staying on track with their goals and encourage them to return to the site by clicking on a link to review how they can reach their goal or sign up for more actions, etc. The user can also choose whether they would like to receive a daily, weekly or monthly summary of their usage, goals and targets.

Figure 25:
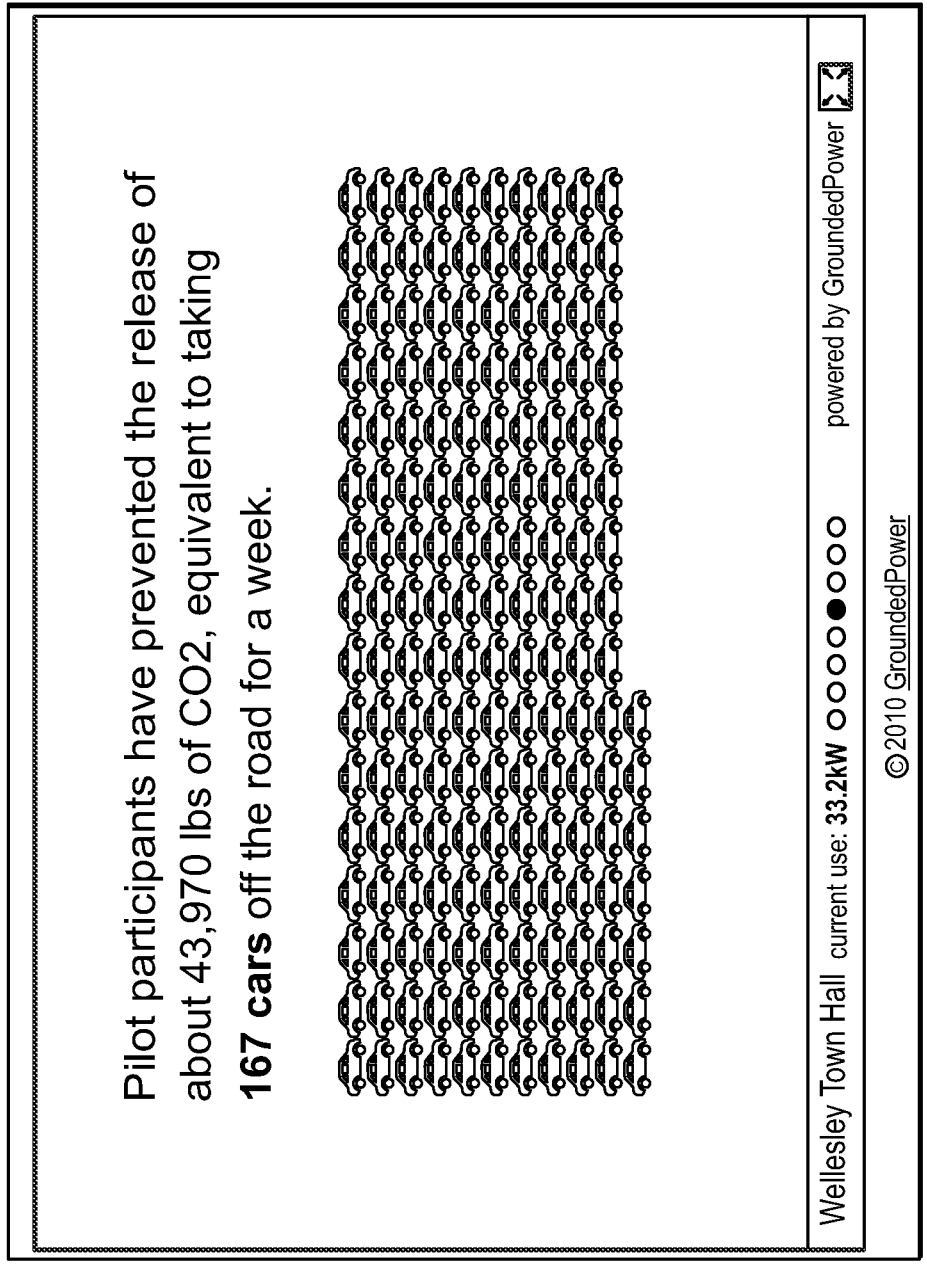
FIG. 25 is a screenshot of an example of a kiosk page in accordance with one or more embodiments.

In accordance with one or more embodiments, installations (particularly commercial installations) can have a public display page showing real-time tracking data, as well as progress towards goals. An in-building Kiosk can be used, e.g., to engage individuals in the savings process by displaying information conveniently and graphically, including results of energy savings challenges. The Kiosk can include a flash movie that allows it to be displayed using a variety of display types. The kiosk changes its display periodically, e.g., on average every 10 seconds, to continually show new information to occupants. The Kiosk pages can be displayed in the lobby of any of the buildings using, e.g., a standard LCD computer display. The kiosk screens can also be displayed on desktop displays for classrooms or offices. This creates an engaging narrative around a building's participation. A sample Kiosk screenshot is shown in FIG. 25.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Having described preferred embodiments of the present invention, it should be apparent that modifications can be made without departing from the spirit and scope of the invention.

What is claimed is:

1. A method of managing energy usage in a first building, the method comprising:
   collecting data on energy consumption in the first building on a generally continuous basis for at least a given time period;
   receiving an indication of a cohort or group of cohorts, wherein the cohort or group of cohorts is associated with at least one building other than the first building;
   collecting data on energy consumption of the cohort or group of cohorts;
   comparing, with a processor, at least a portion of the data collected on energy consumption in the first building to at least a portion of the data collected on energy consumption data of the cohort or group of cohorts;
   transmitting information relating to the energy consumption to be displayed to a user on one or more devices in the first building, said information comprising (a) an indication of the data collected on energy consumption in the first building and (b) an indication of the comparison of at least a portion of the data collected on energy consumption in the first building to at least a portion of the data collected on energy consumption data of the cohort or group of cohorts;
   generating, with a processor, progress report data comparing the data collected on energy consumption to a desired consumption level; and
   creating a savings plan for the user, and wherein the progress report data compares the data collected on energy consumption in the first building to the savings plan, wherein the savings plan includes an indication of a first action that the user has considered, a second action that the user has committed to, a third action that the user has completed, and an indication of a total estimated savings of committed and completed actions.

2. The method of claim 1, further comprising:
   calculating and displaying device or equipment level energy consumption and costs in the first building.

3. The method of claim 1, further comprising:
   enabling the user to select the cohort or group of cohorts.

4. The method of claim 3, further comprising:
   collecting energy usage data from multiple other users who can be used as a cohort or group of cohorts.

5. The method of claim 1, further comprising;
   displaying data on energy consumption in a unit selected from a set of possible units deemed to affect user behavior.

6. The method of claim 1 wherein the one or more devices includes a display in the first building that provides persistent feedback to the user on energy usage in the first building for encouraging user behavior reducing or changing energy usage in the first building.

7. The method of claim 6 wherein the display comprises an ambient device.

8. The method of claim 7 wherein the information is displayed in a color coded format on the ambient device.

9. The method of claim 7 wherein the information is displayed in a bar graph format on the ambient device.

10. The method of claim 1 wherein the one or more devices includes a client device that retrieves the information from a Web server.

11. The method of claim 10 wherein the information is displayed on a dashboard accessible from a Web portal hosted by the Web server.

12. The method of claim 1 wherein the one or more devices includes a mobile communication device operated by the user.

13. The method of claim 1 wherein at least a portion of the data on energy consumption in the first building is displayed in a graphical format.

14. The method of claim 1 further comprising:
providing an audio output indicating energy consumption in the first building.

15. The method of claim 1 wherein collecting data comprises performing plug level or circuit level monitoring of electricity usage.

16. The method of claim 15, further comprising:
controlling an appliance in the first building based on a specified user preference.

17. The method of claim 1 wherein the desired consumption level is based on historical energy usage data.

18. The method of claim 1 wherein the information further includes a snapshot of energy consumption for the first building for a given period of time.

19. The method of claim 1 wherein the information further includes data on incentives provided to the user for meeting energy savings goals.

20. The method of claim 1, further comprising:
generating, with a processor, recommendations for reducing energy consumption in the first building based on the data collected on energy consumption, said information further comprising the generated recommendations for reducing energy consumption in the first building based on the data collected on energy consumption.

21. The method of claim 1, said information further comprising the progress report data comparing the data collected on energy consumption to a desired consumption level.

22. The method of claim 20 wherein the recommendations are based on an energy audit of the first building.

23. The method of claim 19 wherein the incentives include social recognition points.

24. A system for managing energy usage in a first building, comprising:
an apparatus for collecting data on energy consumption in the first building on a generally continuous basis for at least a given time period;
a gateway communicating with the apparatus for receiving data on energy consumption in the first building, said gateway transmitting the data on energy consumption in the first building to a remote server computer system; and
one or more devices, communicating with the gateway or the remote server computer system, for receiving information relating to the energy consumption in the first building, said information comprising (a) at least a portion of the data collected on energy consumption and (b) a comparison of the data collected on energy consumption in the first building to energy consumption data of a cohort or group of cohorts, wherein the cohort or group of cohorts is associated with at least one building other than the first building,
wherein the apparatus includes a transmitter for wirelessly transmitting current measurement data to the gateway.

25. The system of claim 24 wherein the apparatus comprises an electricity meter.

26. The system of claim 24, wherein the apparatus comprises a current transformer that measures current in a circuit.

27. The system of claim 24 wherein the information further includes data on device or equipment level energy consumption and costs in the first building.

28. The system of claim 24, said information further comprising recommendations for reducing energy consumption in the building based on the data collected on energy consumption, and progress report data comparing the data collected on energy consumption to a desired consumption level.

29. The system of claim 24 wherein the remote server computer system enables the user to select the cohort or group of cohorts.

30. The system of claim 24 wherein the remote server computer system collects energy usage data from multiple other users who can be used as a cohort or group of cohorts.

31. The system of claim 24 wherein the one or more devices displays data on energy consumption in a unit selected from a set of possible units deemed to affect user behavior.

32. The system of claim 24 wherein the one or more devices includes a display in the first building that provides persistent feedback to the user on energy usage in the first building for encouraging user behavior reducing or changing energy usage in the first building.

33. The system of claim 32 wherein the display comprises an ambient device.

34. The system of claim 33 wherein the information is displayed in a color coded format on the ambient device.

35. The system of claim 33 wherein the information is displayed in a bar graph format on the ambient device.

36. The system of claim 24 wherein the remote server computer system comprises a Web server, and the one or more devices includes a client device that retrieves the information from the Web server.

37. The system of claim 36 wherein the information is displayed on a dashboard accessible from a Web portal hosted by the Web server.

38. The system of claim 24 wherein the one or more devices includes a mobile communication device operated by the user.

39. The system of claim 24 wherein the one or more devices further provides an audio output indicating energy consumption in the first building.

40. The system of claim 24 wherein the apparatus performs plug level or circuit level monitoring of electricity usage in the first building.

41. The system of claim 40 wherein the server controls an appliance in the first building based on a specified user preference.

42. The system of claim 24 wherein the desired consumption level is based on historical energy usage data.

43. The system of claim 24 wherein the information further includes a snapshot of energy consumption for the first building for a given period of time.

44. The system of claim 24 wherein the information further includes data on incentives provided to the user for meeting energy savings goals.

45. The system of claim 24 wherein the incentives include rewards tied to third parties that can be redeemed via a mobile device operated by the user.

46. The system of claim 28 wherein the remote server computer system creates a savings plan for the user, and wherein the progress report data compares the data collected on energy consumption to the savings plan.

47. The system of claim 46 wherein the recommendations are based on an energy audit of the first building.

48. The system of claim 24, further comprising:
   receiving, from the user, a comment on an action performed by a member of the cohort or group of cohorts with respect to energy consumption; and
   receiving, from the member of the cohort or group of cohorts, a comment on an action performed by the user with respect to energy consumption.

49. A computer-readable storage medium storing instructions that, if executed by a computing system having a processor, cause the computing system to perform operations for managing energy usage in a first building, the operations comprising:
   collecting data on energy consumption in the first building;
   transmitting information relating to the energy consumption in the first building, said information comprising a comparison of the data collected on energy consumption in the first building to energy consumption data of a cohort or group of cohorts, wherein the cohort or group of cohorts is associated with at least one building other than the first building; and
   receiving, from a user, a selection of a cohort.

50. The computer-readable storage medium of claim 49 wherein the information further includes, for each of a plurality of users, a snapshot of energy consumption for a building associated with the user for a given period of time, so that the information comprises a plurality of snapshots associated with different buildings.

51. The computer-readable storage medium of claim 49 wherein the information relating to the energy consumption is displayed in pounds of carbon dioxide.

52. The computer-readable storage medium of claim 49, the operations further comprising:
   collecting energy usage data from multiple other users pertaining to at least one other building, wherein the multiple other users can be used as a cohort or group of cohorts.

53. The computer-readable storage medium of claim 49 wherein the collected information is collected via a current transformer affixed to and encircling a conductor wire of the building.

54. The computer-readable storage medium of claim 49, said information further comprising recommendations for reducing energy consumption in the first building based on the data collected on energy consumption, and progress report data comparing the data collected on energy consumption to a desired consumption level.

55. The computer-readable storage medium of claim 54 wherein the recommendations are based on an energy audit in the form of a questionnaire wherein the questionnaire includes a plurality of questions about the first building.

56. The computer-readable storage medium of claim 54, the operations further comprising:
   creating a savings plan for the user,
   wherein the progress report data compares the data collected on energy consumption to the savings plan, and
   wherein the savings plan is based on an energy audit comprising a questionnaire wherein the questionnaire includes a plurality of questions about the first building and a plurality of questions about the use of heating and cooling appliances in the first building.

57. The computer-readable storage medium of claim 49, the operations further comprising:
   creating a savings plan including an indication of a first action that a first user has completed.

58. The computer-readable storage medium of claim 49, the operations further comprising:
   creating a savings plan including an indication of a first action that a first user has considered.

59. The computer-readable storage medium of claim 49, the operations further comprising:
   creating a savings plan including an indication of a total estimated savings of committed and completed actions.

60. The computer readable storage medium of claim 49, the operations further comprising:
   for each of a plurality of devices,
      determining whether the user has the device,
      in response to determining that the user has the device, adding an indication of an action associated with the device to a savings plan for the user,
      in response to determining that the user does not have the device,
         not adding an indication of an action associated with the device to the savings plan for the user.

61. The computer-readable storage medium of claim 49, the operations further comprising:
   creating a savings plan including an indication of a first action that a first user has committed to.

62. The computer-readable storage medium of claim 49, wherein the information relating to the energy consumption is provided in units of carbon dioxide.

* * * * *